US012581335B2

(12) United States Patent
Jeong

(10) Patent No.: US 12,581,335 B2
(45) Date of Patent: Mar. 17, 2026

(54) METHOD AND APPARATUS FOR QOE MEASUREMENT REPORT IN NEXT-GENERATION MOBILE COMMUNICATION SYSTEM

(71) Applicant: Samsung Electronics Co., Ltd., Suwon-si (KR)

(72) Inventor: Seungbeom Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 18/315,417

(22) Filed: May 10, 2023

(65) Prior Publication Data

US 2023/0370878 A1      Nov. 16, 2023

(30) Foreign Application Priority Data

May 10, 2022      (KR) ........................ 10-2022-0057395

(51) Int. Cl.
*H04W 24/08*      (2009.01)
*H04W 24/10*      (2009.01)
*H04W 80/12*      (2009.01)

(52) U.S. Cl.
CPC ........... *H04W 24/08* (2013.01); *H04W 24/10* (2013.01); *H04W 80/12* (2013.01)

(58) Field of Classification Search
CPC ...... H04W 24/08; H04W 24/10; H04W 80/12
See application file for complete search history.

(56) References Cited

U.S. PATENT DOCUMENTS

| | | | |
|---|---|---|---|
| 2016/0373509 A1 | 12/2016 | Lee | |
| 2020/0112907 A1 * | 4/2020 | Dao ................. | H04M 15/8016 |
| 2023/0370878 A1 * | 11/2023 | Jeong .................... | H04W 24/10 |

(Continued)

FOREIGN PATENT DOCUMENTS

| | | | | |
|---|---|---|---|---|
| KR | 10-2017-0141579 A | 12/2017 | | |
| WO | WO-2022227967 A1 * | 11/2022 | ............ | H04W 24/00 |
| WO | WO-2023212912 A1 * | 11/2023 | ........ | H04W 36/0088 |

OTHER PUBLICATIONS

3GPP TSG-RAN WG2 Meeting #117, R2-2204218 (Year: 2022).*

(Continued)

*Primary Examiner* — Deepa Belur

(57)      ABSTRACT

The disclosure relates to a 5G or 6G communication system for supporting a higher data transmission rate. A method performed by a terminal in a wireless communication system is provided. The method includes receiving, from a base station, a radio resource control (RRC) message including configuration information on an application layer measurement, for each application layer measurement configuration identifier (ID), setting an application layer measurement report entry in an application layer measurement report message, based on the configuration information, and transmitting, to the base station, the application layer measurement report message. The application layer measurement report message includes a plurality of application layer measurement configuration IDs and a plurality of application layer measurement report entries associated with the plurality of application layer measurement configuration IDs.

20 Claims, 26 Drawing Sheets

MeasurementReportAppLayer Message

| MeasurementReportAppLayer-r17-IEs | MeasurementReportAppLayer-r17-IEs | MeasurementReportAppLayer-r17-IEs | |
|---|---|---|---|
| measConfigAppLayerId=8 | measConfigAppLayerId=3 | measConfigAppLayerId=7 | |
| measReportAppLayerContainer8 | measReportAppLayerContainer3 | measReportAppLayerContainer7 | • • • • • |
| appLayerSessionStatus8 ran-VisibleMeasurements8 | appLayerSessionStatus3 ran-VisibleMeasurements3 | appLayerSessionStatus7 ran-VisibleMeasurements7 | |

(56)                    References Cited

U.S. PATENT DOCUMENTS

2024/0224100 A1*    7/2024    Jung .................... H04W 24/10

OTHER PUBLICATIONS

International Search Report and Written Opinion of the International Searching Authority dated Aug. 1, 2023, in connection with International Application No. PCT/KR2023/006354, 6 pages.
Ericsson, "Introduction of QoE measurements in NR," R2-2204218, 3GPP TSG-RAN WG2 Meeting #117, Electronic Meeting, Feb. 21-Mar. 3, 2022, 1033 pages.
Samsung, "Class 0 corrections on QoE configuration and report," R2-2205086, 3GPP TSG-RAN WG2 Meeting #118-e, Electronic meeting, Mar. 9-20, 2022, 9 pages.
ZTE, "(TP to BL CR of TS38.300) Consideration on NR QoE Configuration," R3-222365, 3GPP TSG-RAN WG3 #114bis-e, Jan. 17-26, 2022, 4 pages.
Huawei et al., "Discussion on applicationLayerSessionStatus (RIL: H056)," R2-2206128, 3GPP TSG-RAN WG2 Meeting #118-e, E-meeting, May 9-20, 2022, 6 pages.
Apple, "AT Command for QoE measurements reporting in NR," C1-223649, 3GPP TSG-CT WG1 Meeting #136-e, E-meeting, May 12-20, 2022, 4 pages.

3GPP TS 38.331 V17.0.0 (Mar. 2022), Technical Specification, 3rd Generation Partnership Project; Technical Specification Group Radio Access Network; NR; Radio Resource Control (RRC) protocol specification (Release 17), Mar. 2022, 1221 pages.
Supplementary European Search Report dated Jun. 30, 2025, in connection with European Patent Application No. 23803840.0, 12 pages.
Ericsson, "Feature summary for 8.14.3," 3GPP TSG-RAN WG1 Meeting #116bis-e, Tdoc R2-2201926, Jan. 2022, 13 pages.
Lenovo et al., "Further discussion on transmission of QoE reports", 3GPP TSG RAN WG2 Meeting #116-e, R2-2109832, Electronic, Nov. 2021, 4 pages.
Ericsson, "Feature summary for 8.14.2.1," 3GPP TSG-RAN WG1 Meeting #116bis-e, Tdoc R2-2111536, Nov. 2021, 29 pages.
Qualcomm Inc., "SoD on CB: # QoE6_MDTAlignment," 3GPP TSG-RAN WG3 #114bis-e, Jan. 2022, R3-221313, 34 pages.
Samsung, "Timing information of measured samples," 3GPP TSG-RAN2 Meeting #119 Electronic, R2-2208392, Aug. 2022, 2 pages.
Samsung, "Remaining QoE issues," 3GPP TSG-RAN2 Meeting #116bis Electronic, R2-2200548, Jan. 2022, 3 pages.
CATT, "Discussion on the remaining open issues," 3GPP TSG-RAN WG2 Meeting #116bis electronic, R2-2201421, Jan. 2022, 3 pages.
Qualcomm Inc., "Left issues of QoE configuration, reporting, pause, resume and Mobility," 3GPP TSG-RAN WG2 Meeting #116bis-e, R2-2200684, Jan. 2022, 8 pages.

* cited by examiner

METHOD AND APPARATUS FOR QOE MEASUREMENT REPORT IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2022-0057395, filed on May 10, 2022, in the Korean Intellectual Property Office, the disclosure of which is herein incorporated by reference in its entirety.

BACKGROUND

1. Field

The disclosure relates to operations of a terminal and a base station for quality of experience (QoE) measurement reporting in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

With the development of wireless communication systems, a need for a method and apparatus for more efficiently performing QoE measurement reporting in a next-generation mobile communication system has emerged.

In an embodiment, a method performed by a terminal in a wireless communication system is provided. The method includes receiving, from a base station, a radio resource control (RRC) message including configuration information on an application layer measurement, for each application layer measurement configuration identifier (ID), setting an application layer measurement report entry in an application layer measurement report message, based on the configuration information, and transmitting, to the base station, the application layer measurement report message. The application layer measurement report message includes a plurality of application layer measurement configuration IDs and a plurality of application layer measurement report entries associated with the plurality of application layer measurement configuration IDs.

In an embodiment, a method performed by a base station in a wireless communication system is provided. The method includes transmitting, to a terminal, an RRC message including configuration information on an application layer measurement, and receiving, from the terminal, an application layer measurement report message including, for each application layer measurement configuration ID, an application layer measurement report entry which is set according to the configuration information. The application layer measurement report message includes a plurality of application layer measurement configuration IDs and a plurality of application layer measurement report entries associated with the plurality of application layer measurement configuration IDs.

In an embodiment, a terminal in a wireless communication system is provided. The terminal includes a transceiver and a controller. The controller is configured to receive, from a base station via the transceiver, an RRC message including configuration information on an application layer measurement, for each application layer measurement configuration ID, set an application layer measurement report entry in an application layer measurement report message, based on the configuration information, and transmit, to the base station via the transceiver, the application layer measurement report message. The application layer measurement report message includes a plurality of application layer measurement configuration IDs and a plurality of application layer measurement report entries associated with the plurality of application layer measurement configuration IDs.

In an embodiment, a base station in a wireless communication system is provided. The base station includes a transceiver and a controller. The controller is configured to transmit, to a terminal via the transceiver, an RRC message including configuration information on an application layer measurement, and receive, from the terminal via the transceiver, an application layer measurement report message including, for each application layer measurement configuration ID, an application layer measurement report entry which is set according to the configuration information. The application layer measurement report message includes a plurality of application layer measurement configuration IDs and a plurality of application layer measurement report entries associated with the plurality of application layer measurement configuration IDs.

According to an embodiment of the disclosure, a terminal can perform a QoE measurement report more efficiently in a next-generation mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10B illustrates a UE operation for reporting a QoE measurement result according to an embodiment of the disclosure;

FIG. 12 illustrates a structure of a UE according to an embodiment of the disclosure.

DETAILED DESCRIPTION

Figure 1:
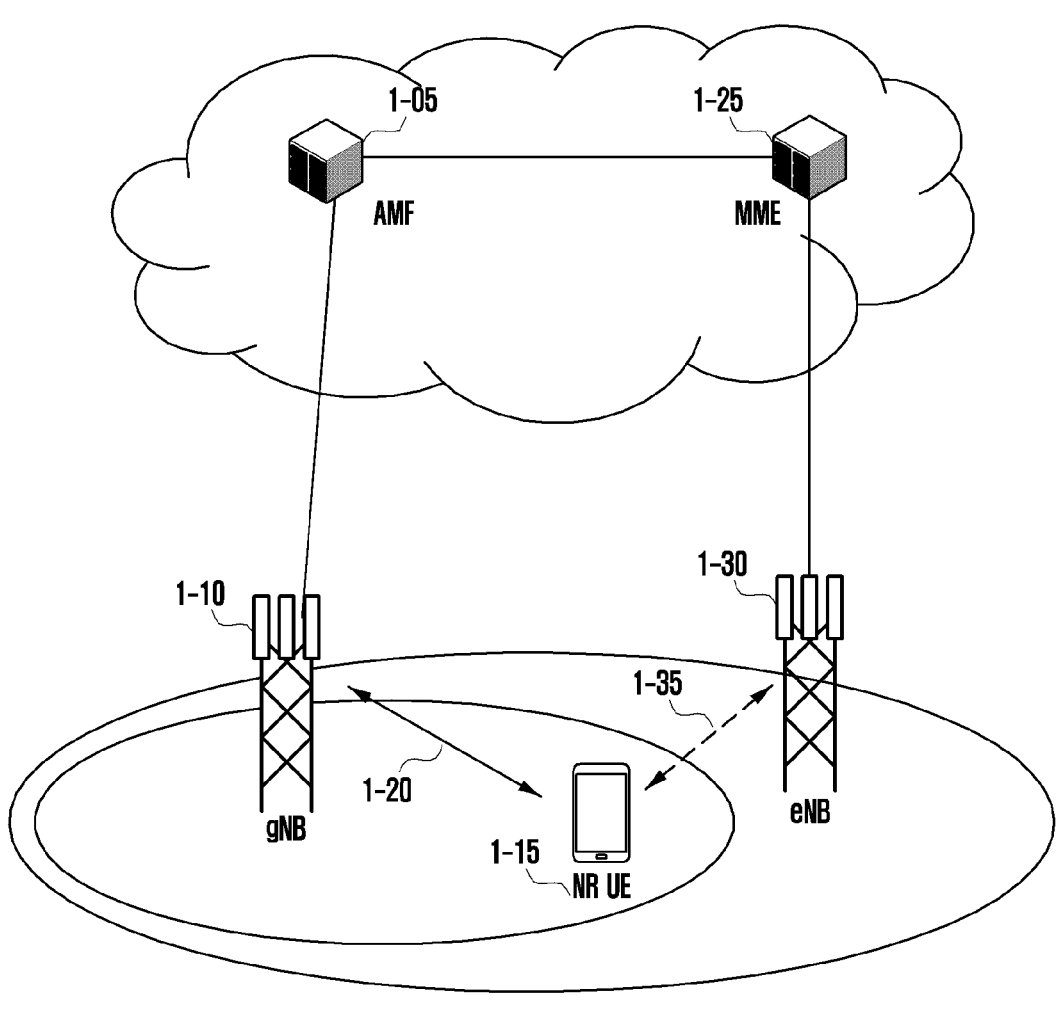
FIG. 1 illustrates a structure of a next-generation mobile communication system according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit." or divided into a larger number of elements, or a "unit." Moreover, the elements and "units" or may be implemented to reproduce one or more CPUs within a device or a security multimedia card.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

FIG. 1 illustrates the structure of a next-generation mobile communication system according to an embodiment of the disclosure.

Referring to FIG. 1, a radio access network of a next-generation mobile communication system (new radio (NR)) as shown in the drawing may include a next-generation base station (new radio node B, hereinafter referred to as a gNB) 1-10 and an AMF (new radio core network) 1-05. A user equipment (new radio user equipment, hereinafter referred to as an NR UE or terminal) 1-15 may access an external network via the gNB 1-10 and the AMF 1-05.

In FIG. 1, the gNB corresponds to an evolved node B (eNB) of the existing LTE system. The gNB is connected to the NR UE via a radio channel, and may provide an excellent service as compared to the existing node B (indicated by reference numeral 1-20). In the next-generation mobile communication system, since all types of user traffics are serviced through a shared channel, there is a need for a device for performing scheduling by collecting state information, such as buffer states, available transmission power states, and channel states of UEs.

Further, the gNB 1-0 is in charge of this function of the device. In general, one gNB typically controls multiple cells. In order to implement ultra-high speed data transmission as compared to the existing LTE, the gNB may have the existing maximum bandwidth or more, and may additionally employ beamforming technology using orthogonal frequency division multiplexing (OFDM) as a radio access technology. In addition, the gNB adopts an adaptive modulation & coding (AMC) scheme that determines a modulation scheme and a channel coding rate based on the channel state of a UE. The AMF 1-05 performs functions, such as mobility support, bearer configuration, QoS configuration, and the like. The AMF is a device that is in charge of various control functions in addition to a mobility management function for a UE, and is connected to multiple base stations.

In addition, the next-generation mobile communication system may also operate in conjunction with the existing LTE system, and the AMF may be connected to an MME 1-25 via a network interface. The MME is connected to an eNB 1-30, that is, to the existing base station. A UE supporting LTE-NR dual connectivity may transmit and receive data while maintaining a connection to the eNB as well as the gNB (indicated by reference numeral 1-35).

Figure 2:
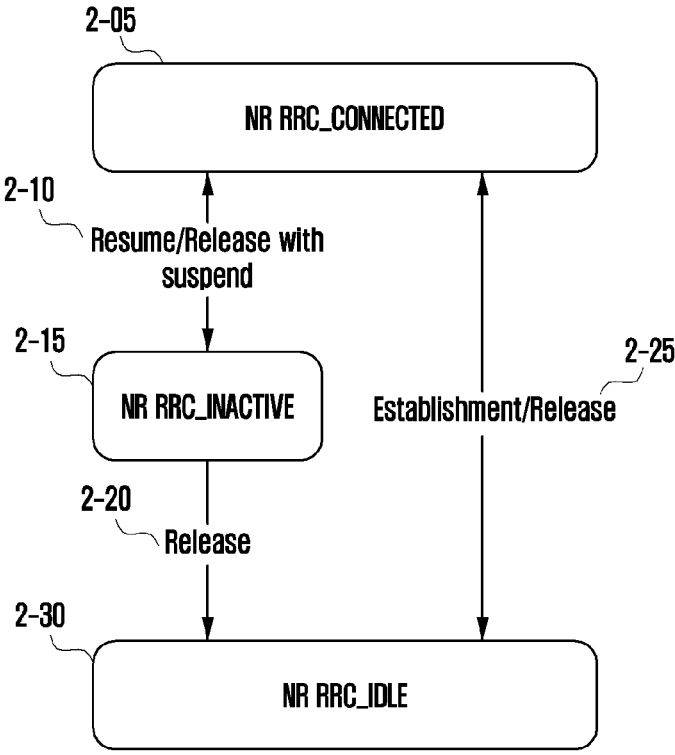
FIG. 2 illustrates a radio access state transition in a next-generation mobile communication system according to an embodiment of the disclosure.

FIG. 2 illustrates radio access state transition in a next-generation mobile communication system according to an embodiment of the disclosure.

In the next generation mobile communication system, there are three radio access states (RRC states). A connected mode (RRC CONNECTED, 2-05) is a radio access state in which a UE can transmit and receive data. An idle mode (RRC IDLE, 2-30) is a radio access state in which the UE monitors whether paging is transmitted to the UE itself. The above two modes are in a radio access state which is also applied to the existing LTE system, and details thereof are the same as those of the existing LTE system. In the next generation mobile communication system, an RRC INACTIVE radio access state 2-15 is newly defined. In the radio access state, the UE context is maintained in the gNB and the UE, and an RAN-based paging is supported. The features of the new radio access state are as follows:

Cell re-selection mobility;

CN-NR RAN connection (both C/U-planes) has been established for UE;

The UE AS context is stored in at least one gNB and the UE;

Paging is initiated by NR RAN;

RAN-based notification area is managed by NR RAN; and

NR RAN knows the RAN-based notification area which the UE belongs to.

The new INACTIVE radio access state may transition to the connected mode or the idle mode through a specific procedure. A resume procedure is used for transition from the INACTIVE mode to the connected mode, and a release procedure including suspend information is used for transition from the connected mode to the INACTIVE mode (indicated by reference numeral 2-10). The resume/release procedure is performed through at least one RRC message transmitted and received between the UE and the gNB, and includes at least one operation. In addition, the transition from the INACTIVE mode to the idle mode is possible through a release procedure after performing a resume procedure (indicated by reference numeral 2-20). The transition between the connected mode and the idle mode complies with the existing LTE technology. That is, this transition between modes is performed through an establishment or release procedure (indicated by reference numeral 2-25).

Figure 3:
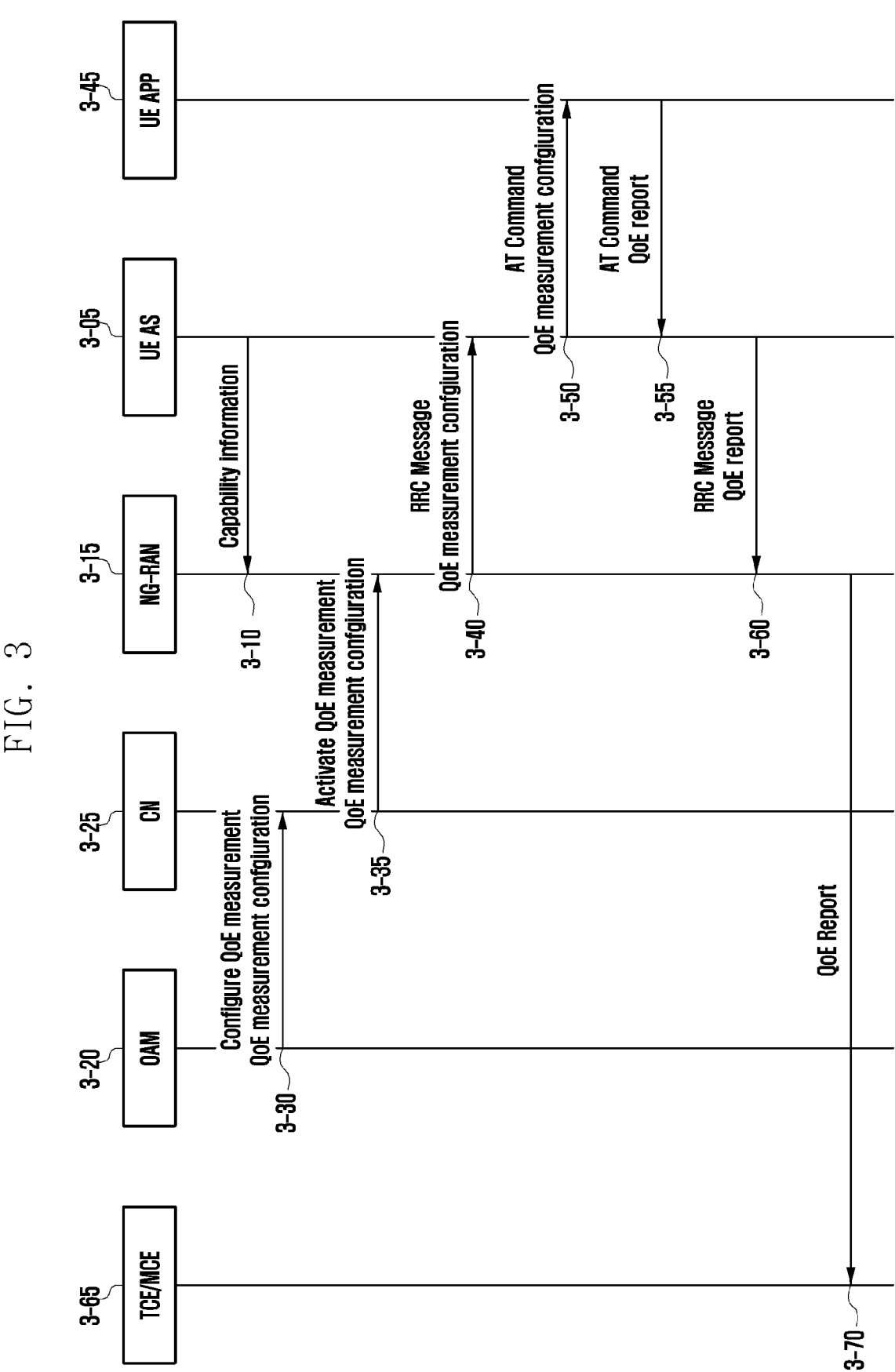
FIG. 3 illustrates a flowchart of a procedure for configuring/reporting signaling-based QoE measurement according to an embodiment of the disclosure.

FIG. 3 illustrates a flowchart of a procedure for configuring/reporting signaling-based QoE measurement according to an embodiment of the disclosure.

A UE access stratum (AS) 3-05 may transmit information indicating whether quality of experience (QoE) measurement is supported for each service type to a base station (or NG-RAN) 3-15) through a UE capability message (indicated by reference numeral 3-10). The message may include ASN.1 information and related parameter descriptions as shown in Tables 1 to 2 below.

TABLE 1

| | |
|---|---|
| MeasParameters-v1530 ::= | SEQUENCE { |
| qoe-MeasReport-r15 | |
| ENUMERATED {supported} | OPTIONAL, |
| qoe-MTSI-MeasReport-r15 | |
| ENUMERATED {supported} | OPTIONAL, |
| ca-IdleModeMeasurements-r15 | |

TABLE 1-continued

| | |
|---|---|
| ENUMERATED {supported} ca-IdleModeValidityArea-r15 | OPTIONAL, |
| ENUMERATED {supported} heightMeas-r15 | OPTIONAL, |
| ENUMERATED {supported} multipleCellsMeasExtension-r15 {supported} } | OPTIONAL, ENUMERATED OPTIONAL |

TABLE 2

| qoe-MeasReport |
|---|
| Indicates whether the UE supports QoE Measurement Collection for streaming services. |
| qoe-MTSI-MeasReport |
| Indicates whether the UE supports QoE Measurement Collection for MTSI services. |

As in the above example, the LTE may support streaming and multimedia telephony service for IP multimedia subsystem (IMS) (MTSI), and NR may support virtual reality (VR), multimedia broadcast multicast services (MBMS), extended reality (XR), etc.

Operations administration and maintenance (OAM) 3-20 provides QoE measurement configuration information to a core network (CN) 3-25 (indicated by reference numeral 3-30). The CN having received the configuration information may activate QoE measurement by transmitting the configuration information to the base station (indicated by reference numeral 3-35). The base station having received the configuration information may transfer the configuration information to a UE AS through an RRC message (e.g., RRC connection reconfiguration message) (indicated by reference numeral 3-40). The RRC message may include ASN.1 information and related parameter descriptions as shown in Tables 3 to 4 below.

TABLE 3

| measConfigAppLayer-r15 | CHOICE{ | |
|---|---|---|
| | release | NULL, |
| | setup | SEQUENCE{ |
| | | measConfigAppLayerContainer-r15 |
| OCTET STRING (SIZE(1..1000)), | | |
| | serviceType-r15 | |
| ENUMERATED {qoe, qoemtsi, spare6, spare5, spare4, spare3, spare2, spare1} | | |
| | } | |
| } | OPTIONAL, -- Need ON | |

TABLE 4

| measConfigAppLayerContainer |
|---|
| The field contains configuration of application layer measurements, see Annex L (normative) in TS 26.247 and clause 16.5 in TS 26.114. |
| serviceType |
| Indicates the type of application layer measurement. Value qoe indicates Quality of Experience Measurement Collection for streaming services, value qoemtsi indicates Enhanced Quality of Experience Measurement Collection for MTSI. |

Upon receiving this message, the UE AS may transfer the configuration information to a UE application layer (UE APP) 3-45 through an AT command (indicated by reference numeral 3-50) in case that the message corresponds to a message for setting up the configuration. In case that the message corresponds to a message for releasing the configuration, the UE AS may transmit an AT command to the UE APP to delete the stored configuration information. The specific operation of the UE AS having received the RRC message may be expressed as shown in Table 5 below.

TABLE 5

| |
|---|
| The UE may: |
| 1>  if the received otherConfig includes the measConfigAppLayer: |
|     2>  if measConfigAppLayer is set to setup: |
|         3>  forward measConfigAppLayerContainer to upper layers considering the serviceType; |
|         3>  consider itself to be configured to send application layer measurement report; |
|     2>  else: |
|         3>  inform upper layers to clear the stored application layer measurement configuration; |
|         3>  discard received application layer measurement report information from upper layers; |
|         3>  consider itself not to be configured to send application layer measurement report. |

The UE APP may perform QoE measurement according to the received configuration information. In addition, the UE APP may report a result of the measurement to the UE AS through the AT command according to the configuration information (indicated by reference numeral 3-55). Upon receiving the measurement result, the UE AS may report the measurement result to the base station through an RRC message (e.g., MeasReportAppLayer message) (indicated by reference numeral 3-60). SRB4 may be used to report QoE measurement results. The RRC message may include ASN.1 information and related parameter descriptions as shown in Tables 6 to 7 below.

TABLE 6

| MeasReportAppLayer-r15 ::= | SEQUENCE { |
|---|---|
| criticalExtensions | CHOICE { |
|     measReportAppLayer-r15 | |
| MeasReportAppLayer-r15-IEs, | |
|     criticalExtensionsFuture | SEQUENCE { } |
| } | |
| } | |
| MeasReportAppLayer-r15-IEs ::= | SEQUENCE { |
|     measReportAppLayerContainer-r15 | OCTET STRING |
| (SIZE(1..8000)) | OPTIONAL, |
|     serviceType-r15 | |

TABLE 6-continued

| |
|---|
| ENUMERATED {qoe, qoemtsi, spare6, spare5, spare4, spare3, spare2, spare1}      OPTIONAL,<br> nonCriticalExtension     MeasReportAppLayer-<br>v1590-IEs         OPTIONAL |

TABLE 7

| |
|---|
| measReportAppLayerContainer |
| The field contains container of application layer measurements, see Annex L (normative) in TS 26.247 and clause 16.5 in TS 26.114.<br>serviceType |
| Indicates the type of application layer measurement. Value qoe indicates Quality of Experience Measurement Collection for streaming services, value qoemtsi indicates Quality of Experience Measurement Collection for MTSI. |

A detailed UE AS procedure for reporting the QoE measurement result may be expressed as shown in Table 8 below.

TABLE 8

| |
|---|
| A UE capable of application layer measurement reporting in RRC_CONNECTED may initiate the procedure when configured with application layer measurement, i.e., When measConfigAppLayer has been configured by E-UTRAN.<br>Upon initiating the procedure, the UE may:<br>1> if configured with application layer measurement, and SRB4 is configured, and the UE has received application layer measurement report information from upper layers:<br>  2> set the measReportAppLayerContainer in the MeasReportAppLayer message to the value of the application layer measurement report information;<br>  2> set the serviceType in the MeasReportAppLayer message to the type of the application layer measurement report information;<br>  2> submit the MeasReportAppLayer message to lower layers for transmission via SRB4. |

The base station may transfer the measurement result report to a configured final destination (TCE or MCE) 3-65 (indicated by reference numeral 3-70).

Figure 4:
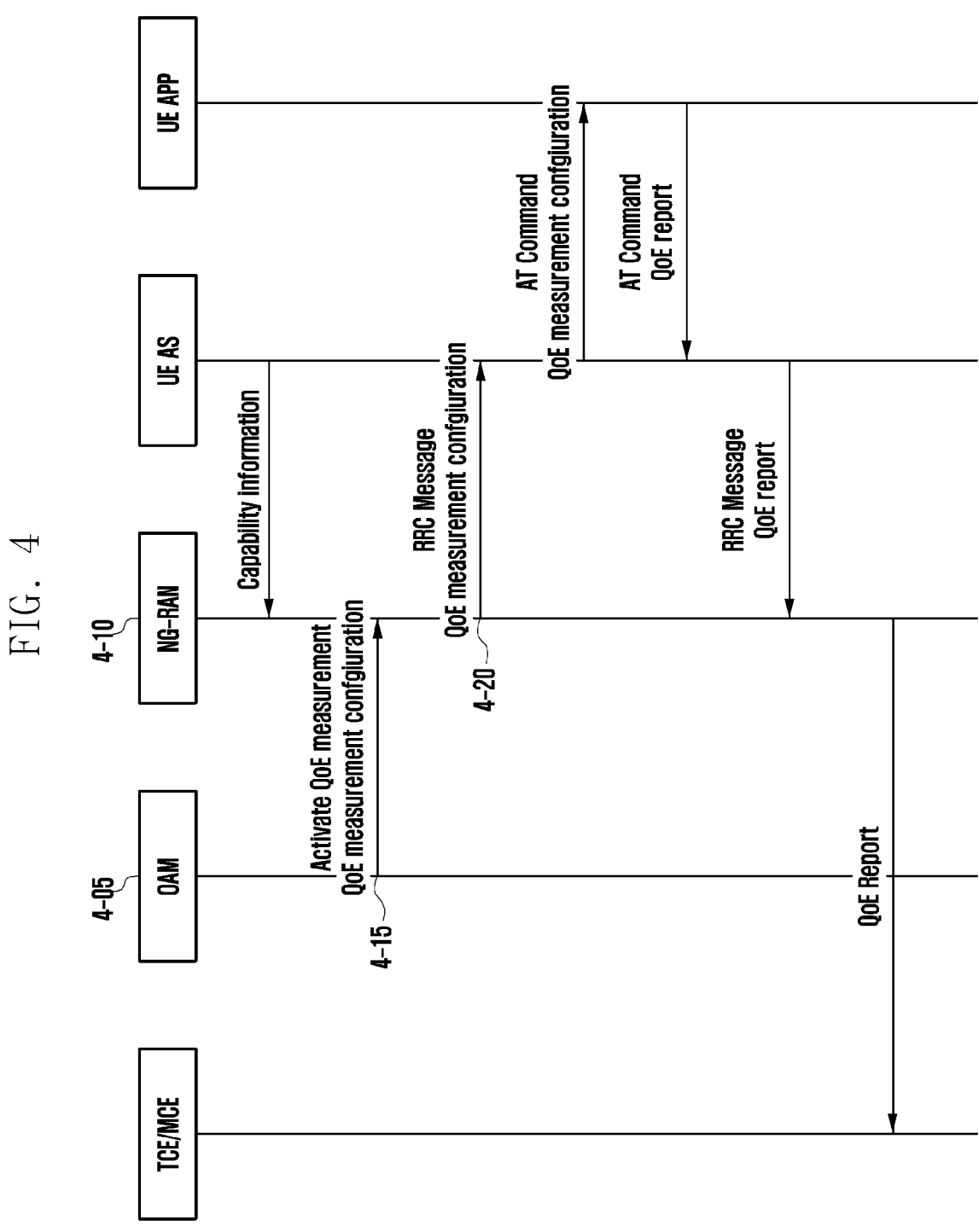
FIG. 4 illustrates a flowchart of a procedure for configuring/reporting management-based QoE measurement according to an embodiment of the disclosure.

FIG. 4 illustrates a flowchart of a procedure for configuring/reporting management-based QoE measurement according to an embodiment of the disclosure.

The management-based QoE configuring/reporting procedure is similar to the signaling-based procedure (FIG. 3). Therefore, in this specification, only the difference which the management-based method has is described below, and other procedures and descriptions may be understood based on the description of FIG. 3. In the management-based method, OAM 4-05 may directly transmit the QoE measurement configuration to a base station 4-10 without going through a CN so as to activate QoE measurement (indicated by reference numeral 4-15). Upon receiving the QoE measurement configuration, the base station may find a single or multiple UEs that meet various conditions (e.g., area scope, application layer capability, service type). In addition, the base station may transmit the QoE measurement configuration to each of the UEs through an RRC message (e.g., an RRC connection reconfiguration message) (indicated by reference numeral 4-20). Other procedures and message types may be understood based on the description of FIG. 3 (signaling-based method).

In order to support QoE measurement in NR, the following procedures and operations may be performed.

1) First, when receiving QoE configuration information, UE operation may be expressed as shown in Table 9 below.

TABLE 9

The UE may:
1>        if measConfigAppLayerToAddReleaseList is included in appLayerMeasConfig within RRCReconfiguration or RRCResume:
        2>       for each measConfigAppLayerId value included in the measConfigAppLayerToReleaseList:
               3>  forward the measConfigAppLayerId and inform upper layers about the release of the application layer measurement configuration including any RAN visible configuration;
               3>  discard any received application layer measurement report received from upper layers;
               3>  consider itself not to be configured to send application layer measurement report for the measConfigAppLayerId.
1>        if measConfigAppLayerToAddModList is included in appLayerMeasConfig within RRCReconfiguration or RRCResume:
        2>       for each measConfigAppLayerId value included in the measConfigAppLayerToAddModList:
               3>  if measConfigAppLayerContainer is included for the corresponding MeasConfigAppLayer configuration:
                      4>  forward the measConfigAppLayerContainer, the measConfigAppLayerId and the serviceType to upper layers considering the serviceType;
               3>  consider itself to be configured to send application layer measurement report for the measConfigAppLayerId;
               3>  forward the transmissionOfSessionStartStop, if received, to upper layers;
               3>  if ran-VisibleParameters is set to setup and the parameters have been received;
                      4>  forward the measConfigAppLayerId, the ran-VisiblePeriodicity, the numberOfBufferLevelEntries and the reportInitialPlayOutDelay to upper layers considering the serviceType;
               3>  else if ran-VisibleParameters is set to release:
                      4>  forward the measConfigAppLayerId and inform upper layers about the release of the RAN visible application layer measurement configuration;
               3>  if pauseReporting is set to true:
                      4>  if at least one segment, but not all segments, of a segmented MeasurementReportAppLayer message containing an application layer measurement report associated with the measConfigAppLayerId has been submitted to lower layers for transmission:
                             5>  submit the remaining segments of the MeasurementReportAppLayer message to lower layers for transmission;
                      4>  suspend submitting application layer measurement report containers to lower layers for the application layer measurement configuration associated with the measConfigAppLayerId;
                      4>  store any previously or subsequently received application layer measurement report containers associated with the measConfigAppLayerId for which no segment, or full message, has been submitted to lower layers for trnamission;
               3>  else if pauseReporting is set to false and if transmission of application layer measurement report containers has previously been suspended for the application layer measurement configuration associated with the measConfigAppLayerId:
                      4>  submit stored application layer measurement report containers to lower layers for the application layer measurements configuration associated with the measConfigAppLayerId;
                      4>  resume submitting application layer measurement report containers to lower layers for the application layer.

NOTE 1:
The UE may discard reports when the memory reserved for storing application layer measurement reports becomes full.
NOTE 2:
The transmission of RAN visible reports is not paused when pauseReporting is set to true.

2) Next, a procedure for performing QoE reporting of a UE in a connected mode may be expressed as shown in Table 10 below.

TABLE 10

A UE capable of application layer measurement reporting in RRC_CONNECTED may initiate the procedure when configured with application layer measurement, i.e., When appLayerMeasConfig and SRB4 have been configured by the network.
Upon initiating the procedure, the UE may:
1>      for each measConfigAppLayerId:
        2>     if the UE AS has received, but not sent, application layer measurement report from upper layers; and TABLE 10-continued 2> if the application layer measurement reporting has not been suspended for the measConfigAppLayerId associated with the application layer measurement report:
    3> set the measReportAppLayerContainer in the MeasurementReportAppLayer message to the received value of the application layer measurement report;
    2> set the measConfigAppLayerId in the MeasurementReportAppLayer message to the value of the measConfigAppLayerId received together with application layer measurement report information;
    2> if session start or stop information has been received from upper layers for the measConfigAppLayerId:
    3> set the appLayerSessionStatus to the received value of the application layer measurement information;
    2> if RAN visible application layer measurement report has been received from upper layers:
    3> for each appLayerBufferLevel value in the received RAN visible application layer measurement report:
    4> set the appLayerBufferLevel values in the appLayerBufferLevelLIst to the buffer level values received from the upper layer in the order with the first appLayerBufferLevel value set to the newest received buffer level value, the second appLayerBufferLevel value set to the second newest received buffer level value, and so on until all the buffer level values received from the upper layer have been assigned or the configured maximum number of appLayerBufferLevel values have been set, if any;
    3> set the initialPlayoutDelay to the received value in the RAN visible application layer measurement report, if any;
    3> for each PDU session ID value indicated in the received RAN visible application layer measurement report, if any:
    4> set the PDU-SessionID field in the pdu-SessionIdList to the indicated PDU session ID value;
    2> if the RRC message segmentation is enabled based on the field rrc-SegAllowed received in appLayerMeasConfig, and the encoded RRC message is larger than the maximum supported size of a PDCP SDU:
    3> initiate the UL message segment transfer procedure;
    2> else:
    3> submit the MeasurementReportAppLayer message to lower layers for transmission upon which the procedure ends.

3) ASN.1 definition of AppLayerMeasConfig, which is an RRC information element (IE) including QoE configuration information, and descriptions of lower IEs may be as shown in Tables 11 to 13 below.

TABLE 11

AppLayerMeasConfig

The IE AppLayerMeasConfig indicates configuration of application layer measurements.

TABLE 12

```
-- ASN1START
-- TAG-APPLAYERMEASCONFIG-START
AppLayerMeasConfig-r17 ::=              SEQUENCE {
    measConfigAppLayerToAddModList-r17           SEQUENCE        (SIZE
(1..maxNrofAppLayerMeas-r17)) OF MeasConfigAppLayer-r17          OPTIONAL, --
Need N
    measConfigAppLayerToReleaseList-r17          SEQUENCE        (SIZE
(1..maxNrofAppLayerMeas-r17)) OF MeasConfigAppLayerId-r17        OPTIONAL, --
Need N
    rrc-SegAllowed-r17                           ENUMERATED    {enabled}
OPTIONAL, -- Need M
    ...
}
MeasConfigAppLayer-r17 ::=               SEQUENCE {
    measConfigAppLayerId-r17                 MeasConfigAppLayerId-r17,
    measConfigAppLayerContainer-r17            OCTET   STRING   (SIZE   (1..8000))
OPTIONAL, -- Need N
    serviceType-r17                          ENUMERATED {streaming, mtsi, vr, spare5, spare4,
spare3, spare2, spare1}              OPTIONAL, -- Need M
    pauseReporting                          BOOLEAN,
    transmissionOfSessionStartStop              BOOLEAN,
    ran-VisibleParameters-r17                    SetupRelease {RAN-VisibleParameters-r17}
```

TABLE 12-continued

```
OPTIONAL, -- Need M
    ...
}
RAN-VisibleParameters-r17 ::=              SEQUENCE {
    ran-VisiblePeriodicity                     ENUMERATED {ms120, ms240, ms480, ms640,
ms1024}                                     OPTIONAL, -- Need S
    numberOfBufferLevelEntries                     INTEGER   (1..8)
OPTIONAL, -- Need R
    reportInitialPlayOutDelay               BOOLEAN,
    ...
}
-- TAG-APPLAYERMEASCONFIG-STOP
-- ASN1STOP
```

TABLE 13

| AppLayerMeasConfig field descriptions |
| --- |
| measConfigAppLayerContainer |
| The field contains configuration of application layer measurements, see Annex L (normative) in TS 26.247, clause 16.5 in TS 26.114 and TS 26.118. |
| numberOfBufferLevelEntries |
| The field contains the maximum number of buffer level entries that can be reported for RAN visible application layer measurements. |
| pauseReporting |
| The field indicates whether the transmission of measReportAppLayerContainer is paused or not. |
| ran-VisiblePeriodicity |
| The field indicates the periodicity of RAN visible reporting. Value ms120 indicates 120 ms, value ms240 indicates 240 ms and so on. If no value is indicated and the UE is configured with RAN visible reporting, the same periodicity as indicated in the measConfigAppLayerContainer is used. |
| reportInitialPlayoutDelay |
| The field indicates whether the UE shall report Initial Playout Delay for RAN visible application layer measurements. |
| rrc-SegAllowed |
| This field, when received in MeasConfigAappLayerMeasConfigList, indicates that RRC segmentation of MeasurementReportAppLayer is allowed. It may be present only if the UE supports RRC message segmentation. |
| serviceType |
| Indicates the type of application layer measurement. Value streaming indicates Quality of Experience Measurement Collection for streaming services (see TS 26.247), value mtsi indicates Quality of Experience Measurement Collection for MTSI (see TS 26.114). value vr indicates Quality of Experience Measurement Collection for VR service (see TS 26.118). The network always configures serviceType when application layer measurements are initially configured and at fullConfig. |
| transmissionOfSessionStartStop |
| The field indicates whether the UE shall transmit indications when sessions in the application layer start and stop. The UE transmits a session start indication upon configuration of this field if a session already has started in the application layer. |

4) ASN.1 definition of a MeasurementReportAppLayer message, which is an RRC message including QoE report information, and descriptions of lower IEs may be as shown in Tables 14 to 16 below.

TABLE 14

MeasurementReportAppLayer

The MeasurementReportAppLayer message is used for sending application layer measurement report.
    Signalling radio bearer: SRB4
    RLC-SAP: AM
    Logical channel: DCCH
    Direction: UE to Network

TABLE 15

```
-- ASN1START
-- TAG-MEASUREMENTREPORTAPPLAYER-START
MeasurementReportAppLayer-r17 ::=                SEQUENCE {
    criticalExtensions                  CHOICE {
        measurementReportAppLayerList-r17            SEQUENCE    (SIZE
(1..maxNrofAppLayerMeas-r17)) OF MeasurementReportAppLayer-r17-IEs,
        criticalExtensionsFuture            SEQUENCE { }
    }
}
MeasurementReportAppLayer-r17-IEs ::=            SEQUENCE {
    measConfigAppLayerId-r17            MeasConfigAppLayerId-r17,
    measReportAppLayerContainer-r17            OCTET        STRING
OPTIONAL,
    appLayerSessionStatus-r17            ENUMERATED {started, stopped}
OPTIONAL,
    ran-VisibleMeasurements-r17            RAN-VisibleMeasurements-r17
OPTIONAL,
    lateNonCriticalExtension            OCTET        STRING
OPTIONAL,
    nonCriticalExtension            SEQUENCE{ }
OPTIONAL
}
RAN-VisibleMeasurements-r17 ::=            SEQUENCE {
    appLayerBufferLevelList-r17            SEQUENCE    (SIZE    (1..8))    OF
AppLayerBufferLevel-r17            OPTIONAL,
    initialPlayoutDelay-r17            INTEGER    (0..30000)
OPTIONAL,
    pdu-SessionIdList-r17            SEQUENCE (SIZE (1..maxNrofPDU-Sessions-
r17)) OF PDU-SessionID            OPTIONAL,
    ...
}
AppLayerBufferLevel-r17 ::= INTEGER (0..30000)
-- TAG-MEASUREMENTREPORTAPPLAYER-STOP
```

TABLE 16

MeasurementReportAppLayer field descriptions appLayerBufferLevel

Indicates the application layer buffer level in ms. Value 1 corresponds to 10 ms, value 2 corresponds to 20 ms and so on. If the buffer level is larger than the maximum value of 30000 (5 minutes), the UE reports 30000.
appLayerSessionStatus Indicates that a QoE session in the application layer starts or stops.
initialPlayoutDelay Indicates the application layer initial playout delay in ms. Value 1 corresponds to 1 ms, value 2 corresponds to 2 ms and so on. If the initial playout delay is larger than the maximum value of 30000 ms, the UE reports 30000 ms.

TABLE 16-continued

| MeasurementReportAppLayer field descriptions |
| --- |
| measReportAppLayerContainer |
| The field contains application layer measurements, see Annex L (normative) in TS 26.247, clause 16.5 in TS 26.114 and TS 26.118. |
| pdu-SessionIdList |
| Contains the identity of the PDU session, or the identities of the PDU sessions, used for application data flows subject to the RAN visible application layer measurements. |

A base station may stop, through the pauseReporting indicator, (by configuring the indicator as "true") or resume (by configuring the indicator as "false") reporting of QoE measurement results of a UE. When RAN overload occurs, the base station may stop QoE reporting of the UE by using the indicator. Even if the UE access stratum (AS) layer having been configured with the indicator of "true" receives the QoE measurement report from the UE application (or APP) layer, the UE AS layer may store the received QoE measurement report instead of transferring the QoE measurement report to the base station. When the RAN overload is resolved, the base station may resume QoE reporting of the UE by using the indicator. When the UE access stratum (AS) layer having been configured with the indicator of "false" receives the QoE measurement report from the UE application (or APP) layer, the UE AS layer may resume the operation of transmitting the QoE measurement report to the base station, and may transfer the QoE measurement report having been stored so far to the base station.

Figure 5A:
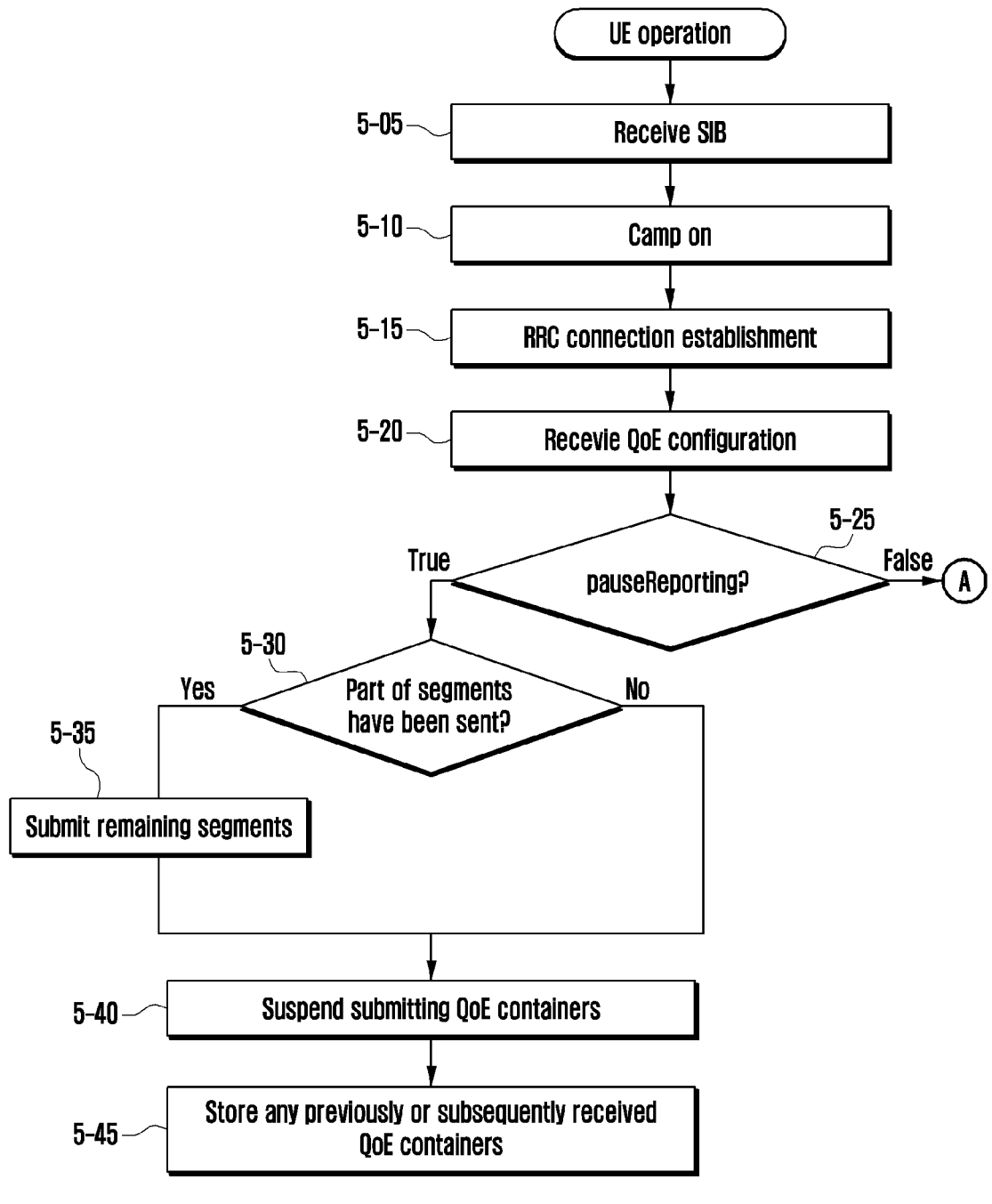
FIG. 5A illustrates an operation of a UE having received QoE configuration information according to an embodiment of the disclosure.
Figure 5B:
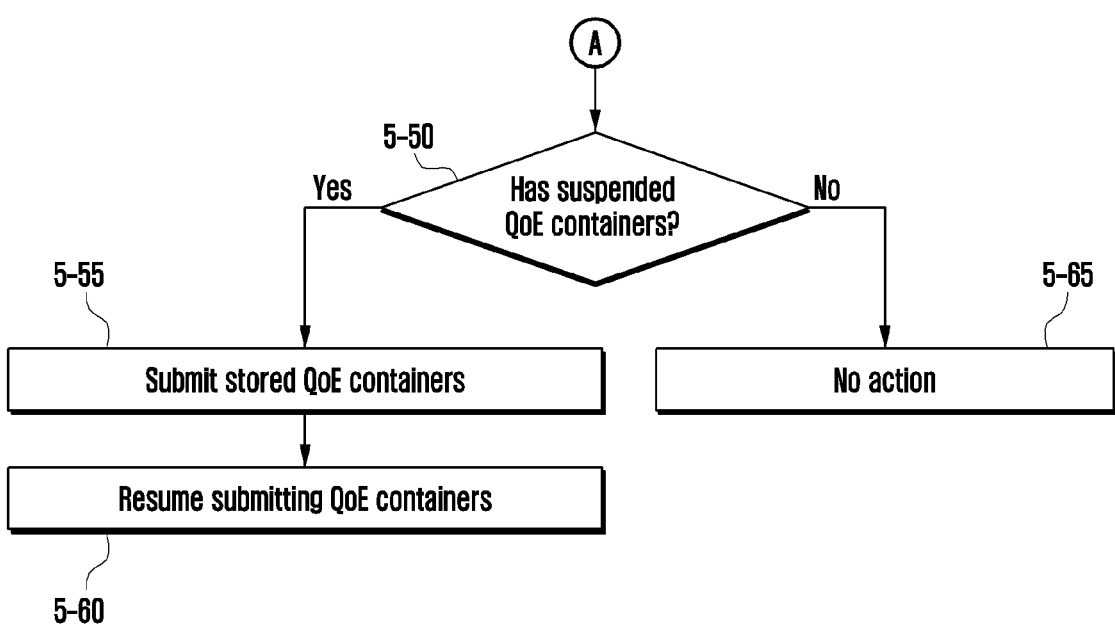
FIG. 5B illustrates an operation of a UE having received QoE configuration information according to an embodiment of the disclosure.

FIGS. 5A and 5B illustrate operations of a UE having received QoE configuration information according to an embodiment of the disclosure.

In operation 5-05, a UE may receive system information (SIB) transmitted by a base station.

In operation 5-10, the UE may camp on a specific base station or cell based on the received SIB.

In operation 5-15, the UE may establish an RRC connection with the camped-on cell or base station.

In operation 5-20, the UE in a connected mode may receive QoE configuration information from the base station. The QoE configuration information may be included in an RRCReconfiguration message and transmitted. Alternatively, a UE in an inactive mode may receive QoE configuration information through an RRCResume message.

In operation 5-25, the UE may determine whether a pauseReporting indicator is configured.

In operation 5-30, when the pauseReporting indicator is configured as true, the UE may determine whether some of segments have been transmitted after performing RRC segmentation for the MeasurementReportAppLayer message.

In operation 5-35, when the UE has ever transmitted only some of segments after performing RRC segmentation for the MeasurementReportAppLayer message, the UE may transmit the remaining untransmitted segments.

In operation 5-40, the UE may suspend transmission of the QoE reporting container (measReportAppLayerContainer). In addition, when the UE has not transmitted only some of segments after RRC segmentation for the MeasurementReportAppLayer message in operation 5-30 (i.e., there are no remaining segments), the UE may suspend transmission of the QoE container (measReportAppLayerContainer).

In operation 5-45, the UE may store a container having been received previously or to be received later.

In case that the pauseReporting indicator is configured as false in operation 5-25, the UE may identify whether transmission of the QoE container has ever been suspended, in operation 5-50.

In operation 5-55, when the transmission of the QoE container has been suspended, the UE may start transmission of the stored QoE container.

In operation 5-60, the UE may resume transmission of the QoE container.

In case that the UE has not ever suspended transmission of the QoE container in operation 5-50, the UE may not perform any further action in operation 5-65.

Figure 6A:
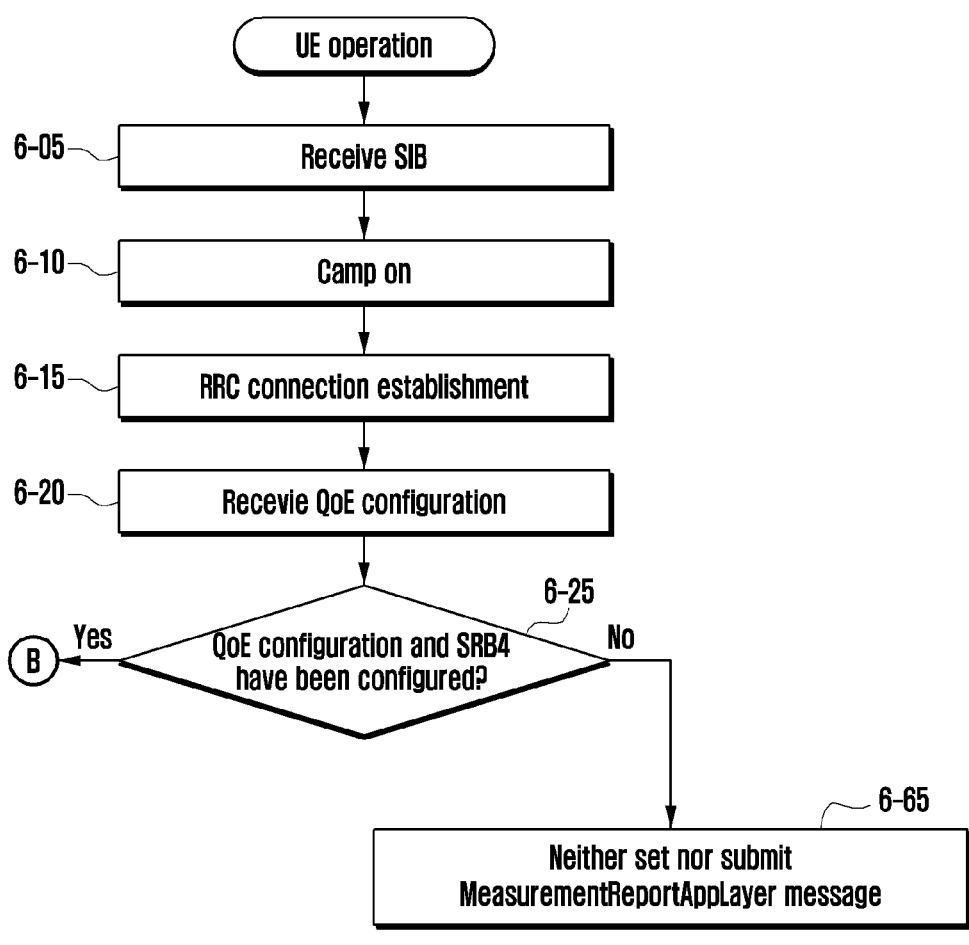
FIG. 6A illustrates a UE operation for reporting a QoE measurement result according to an embodiment of the disclosure.
Figure 6B:
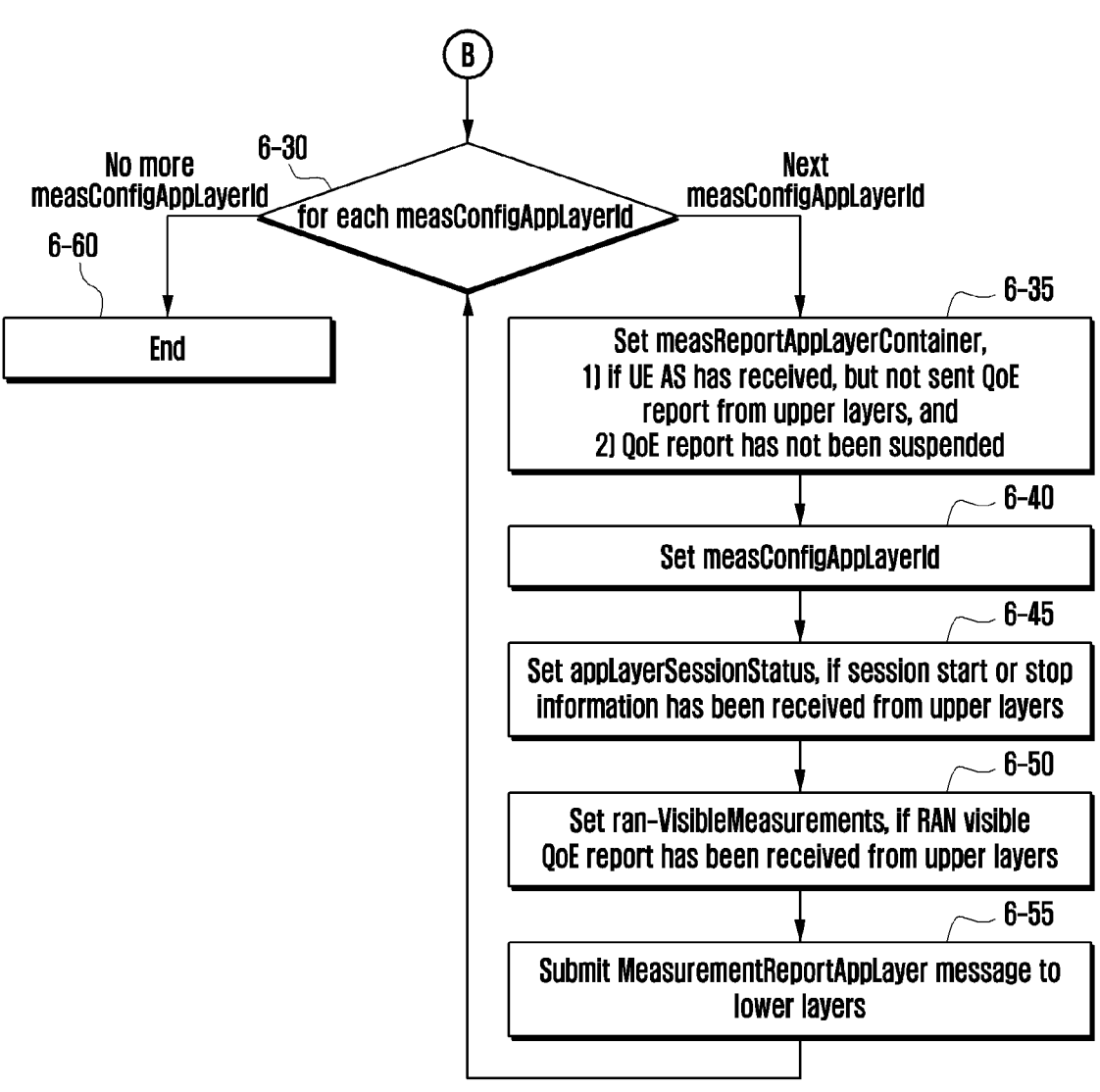
FIG. 6B illustrates a UE operation for reporting a QoE measurement result according to an embodiment of the disclosure.

FIGS. 6A and 6B illustrate a UE operation for reporting a QoE measurement result according to an embodiment of the disclosure.

In operation 6-05, a UE may receive system information (SIB) transmitted by a base station.

In operation 6-10, the UE may camp on a specific base station or cell based on the received SIB.

In operation 6-15, the UE may establish an RRC connection with the camped-on cell or base station.

In operation 6-20, the UE in a connected mode may receive QoE configuration information from the base station. This QoE configuration information may be included in an RRCReconfiguration message and transmitted. Alternatively, a UE in an inactive mode may receive the QoE configuration information through an RRCResume message.

In operation 6-25, the UE in the connected mode may determine whether QoE configuration and SRB4 for QoE report message transmission have been configured.

In operation 6-30, if QoE configuration and SRB4 have been configured, the UE may repeatedly perform operations 6-35 to 6-55 for each measConfigAppLayerId to transmit a QoE report message (MeasurementReportAppLayer).

In operation 6-35, when there is a QoE report that the UE AS layer has received from the app layer but has not sent yet, and the QoE report has not been suspended, the UE may configure a QoE report container (measReportAppLayerContainer) in a MeasurementReportAppLayer message as QoE report information having been received from the app layer.

In operation 6-40, the UE AS layer may configure measConfigAppLayerId in the MeasurementReportAppLayer message as the measConfigAppLayerId having been received from the app layer together with the QoE measurement result.

In operation 6-45, in case that the UE AS layer has received session measurement start and stop information from the app layer, the UE may configure appLayerSessionStatus in the MeasurementReportAppLayer message as the received value.

In operation 6-50, in case that the UE AS layer has received a RAN visible QoE measurement result from the app layer, the UE may configure ran-VisibleMeasurements in the MeasurementReportAppLayer message as the received value.

In operation 6-55, the UE may transmit the MeasurementReportAppLayer message.

In case that operations for all the measConfigAppLayerIds end in operation 6-30, the UE operation may be ended in operation 6-60.

In case that the QoE configuration or SRB4 is not configured in operation 6-25, the UE may neither configure nor transmit the MeasurementReportAppLayer message in operation 6-65.

Among four IEs (measConfigAppLayerId, measReportAppLayerContainer, appLayerSessionStatus, and ran-VisibleMeasurements-r17) included in the QoE report message (i.e., MeasurementReportAppLayer message), three IEs (measReportAppLayerContainer, appLayerSessionStatus, and ran-VisibleMeasurements) are optional IEs and thus may be included or not when the UE transmits the ReportAppLayer message.

1) measReportAppLayerContainer may be a container containing QoE measurement result information received from the app layer. When pauseReporting is configured as true, the UE may stop transmission of measReportAppLayerContainer, and may store QoE measurement results (included in measReportAppLayerContainer) having been received from the app layer previously or subsequently. For example, the UE operation may be expressed as shown in Table 17 below.

2) In a case of measReportAppLayerContainer, even in case that the UE provides reporting to the base station, the base station is unable to read or use the reporting and is only able to transfer the reporting to OAM or TCE. Ran-Visible-Measurements is an IE for reporting QoE measurement results (RAN visible measurement results) that the base station (or RAN) is able to read and use. Even if the base station configures pauseReporting as true, reporting of RAN visible measurement results may not be stopped (The transmission of RAN visible reports is not paused when pauseReporting is set to true). That is, the UE may always report ran-VisibleMeasurements regardless of the pauseReporting configuration of the base station.

3) The appLayerSessionStatus indicator may be used for the UE APP layer to notify the base station that a QoE session or an application session is started (by configuring the indicator to "started"). In addition, the appLayerSessionStatus indicator may be used for the UE APP layer to notify the base station that the QoE session or application session is stopped (by configuring the indicator to "stopped"). However, the existing method does not define whether the appLayerSessionStatus reporting is affected by the pauseReporting configuration (like measReportAppLayerContainer) or not (like ran-VisibleMeasurements).

Therefore, according to the existing method, in case that pauseReporting is indicated to be true, when the UE AS layer receives session start or stop information from the UE APP layer, it is unclear whether or not this information can

TABLE 17

The UE may:
1>       if pauseReporting is set to true:
      2>       if at least one segment, but not all segments, of a segmented MeasurementReportAppLayer message containing an application layer measurement report associated with the measConfigAppLayerId has been submitted to lower layers for transmission:
           3>   submit the remaining segments of the MeasurementReportAppLayer message to lower layers for transmission;
      2>       suspend submitting application layer measurement report containers to lower layers for the application layer measurement configuration associated with the measConfigAppLayerId
      2>       store any previously or subsequently received application layer measurement report containers associated with the measConfigAppLayerId for which no segment, or full message, has been submitted to lower layers for transmission.

In addition, when pauseReporting is configured as false, the UE may resume transmission of measReportAppLayerContainer, and may start transmission of stored QoE measurement results (included in measReportAppLayerContainer) having been received from the app layer. For example, the UE operation may be expressed as shown in Table 18 below.

be reported to the base station by being included in the appLayerSessionStatus, and thus a UE operation for the same is required to be defined clearly. Otherwise, even with the same base station configuration (e.g., when pauseReporting is configured as true), different terminals may perform different operations (e.g., a UE A continuously reports appLayerSessionStatus to a base station, while a UE B stops

TABLE 18

The UE may:
1>       if pauseReporting is set to false and if transmission of application layer measurement report containers has previously been suspended for the application layer measurement configuration associated with the measConfigAppLayerId:
      2>       submit stored application layer measurement report containers to lower layers for the application layer measurements configuration associated with the measConfigAppLayerId;
      2>       resume submitting application layer measurement report containers to lower layers for the application layer.

In summary, the UE may stop or resume reporting of measReportAppLayerContainer according to the pauseReporting configuration of the base station.

reporting appLayerSessionStatus to the base station) according to implementation, and accordingly, the base station may not be able to predict a UE operation for pauseReporting.

As an embodiment of the disclosure, a UE operation may be defined so that the appLayerSessionStatus indicator is affected by pauseReporting of a base station. That is, when the base station configures pauseReporting as true, the UE may not report the appLayerSessionStatus indicator. In addition, when the base station configures pauseReporting as false, the UE may resume reporting of the appLayerSessionStatus indicator. The reason of defining a UE operation such that the appLayerSessionStatus indicator is affected by pauseReporting of the base station may be as follows.

1) In case of RAN overload, services relating to QoE measurement may have a lower priority in order for the base station to perform other services and resource scheduling, and the process of transmitting/receiving and processing the appLayerSessionStatus indicator may be wasteful for the base station and the UE in terms of computing resource use, radio resource use, and energy usage. In particular, the base station is in an overload situation, which may cause a more problem.

2) The RAN visible measurement results may be used to optimize the network and thus help solve the RAN overload problem, whereas the appLayerSessionStatus indicator may not help solve the RAN overload problem.

Figure 7A:
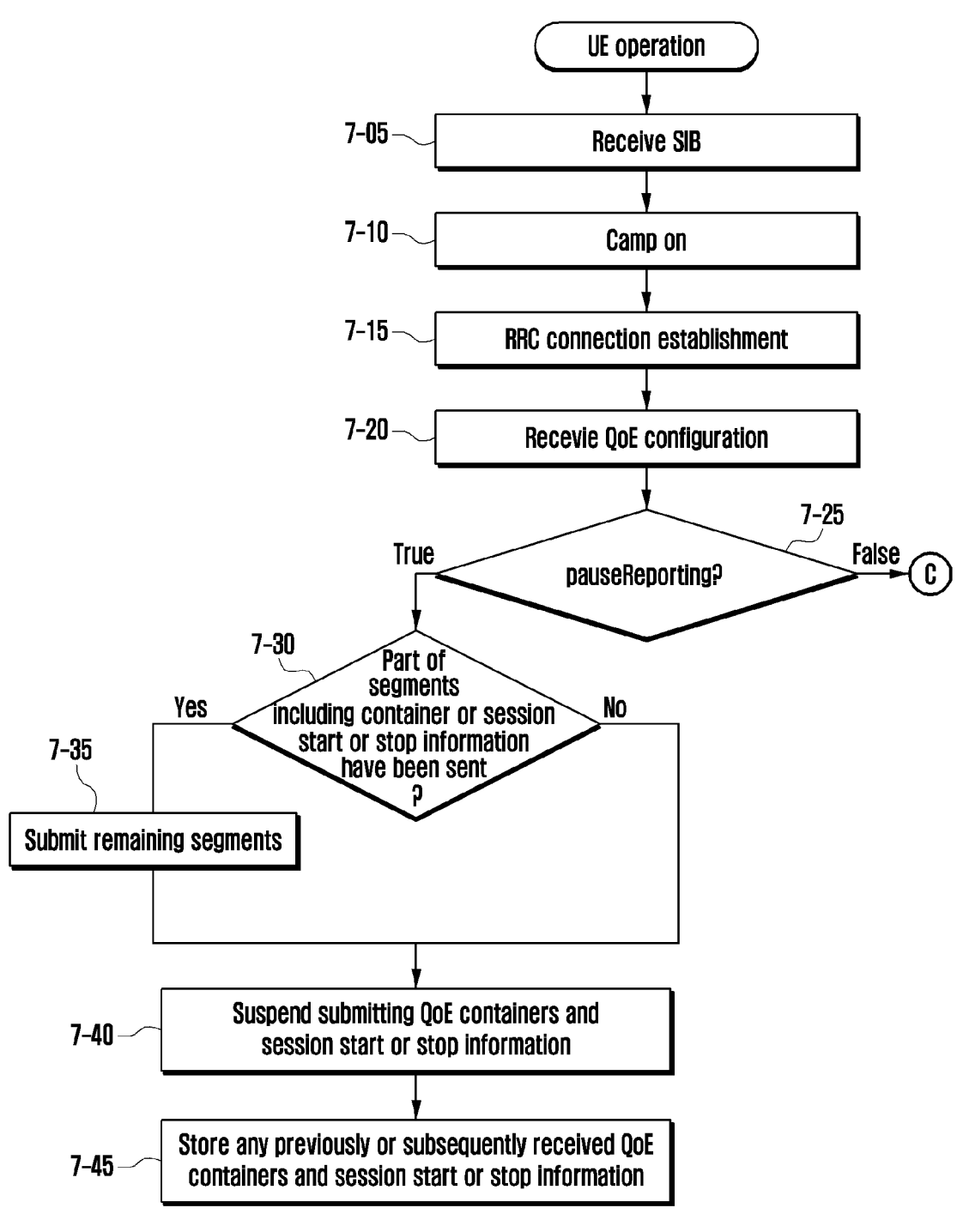
FIG. 7A illustrates an operation of a UE having received QoE configuration information in case that an appLayerSessionStatus indicator is affected by a pauseReporting configuration according to an embodiment of the disclosure.
Figure 7B:
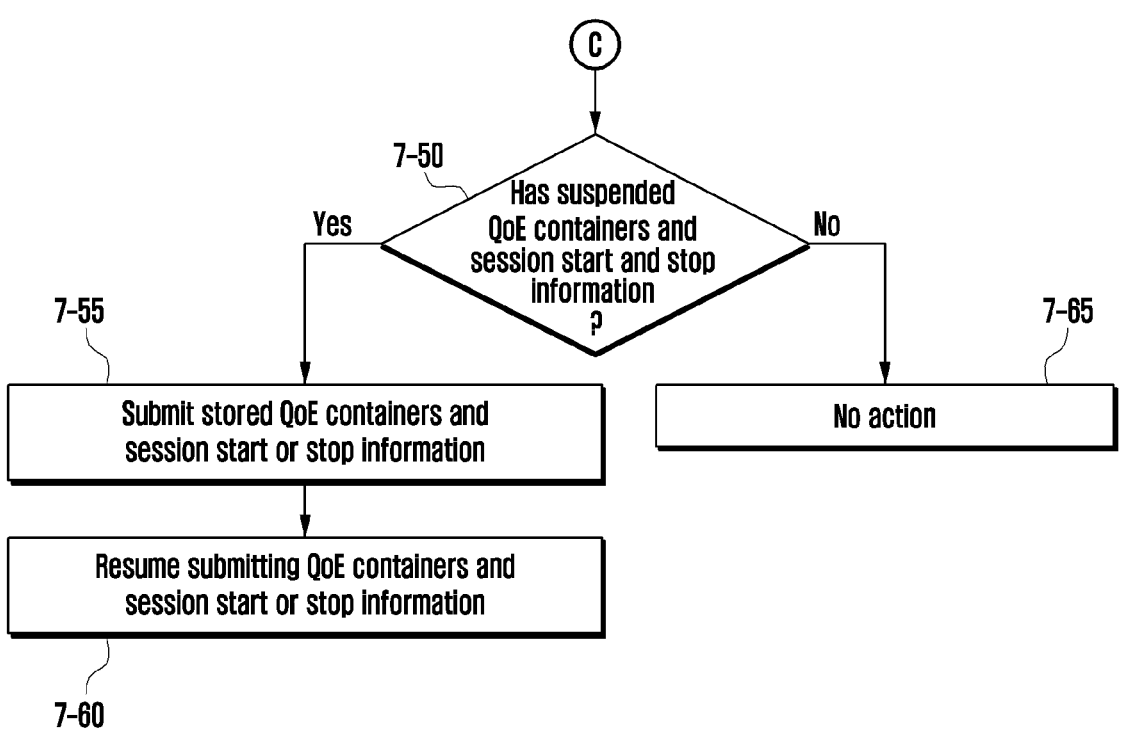
FIG. 7B illustrates an operation of a UE having received QoE configuration information in case that an appLayerSessionStatus indicator is affected by a pauseReporting configuration according to an embodiment of the disclosure.

FIGS. 7A and 7B illustrate an operation of a UE having received QoE configuration information in case that an appLayerSessionStatus indicator is affected by a pauseReporting configuration according to an embodiment of the disclosure.

In operation 7-05, the UE may receive system information (SIB) transmitted by a base station.

In operation 7-10, the UE may camp on a specific base station or cell based on the received SIB.

In operation 7-15, the UE may establish an RRC connection with the camped-on cell or base station.

In operation 7-20, the UE in a connected mode may receive QoE configuration information from the base station. This QoE configuration information may be included in an RRCReconfiguration message and transmitted. Alternatively, a UE in an inactive mode may receive the QoE configuration information through an RRCResume message.

In operation 7-25, the UE may determine whether a pauseReporting indicator is configured.

In operation 7-30, according to the embodiment of the disclosure in case that the pauseReporting indicator is configured as true, the UE may perform RRC segmentation on a MeasurementReportAppLayer message including measReportAppLayerContainer or appLayerSessionStatus, and then may determine whether only some of segments have been transmitted.

In operation 7-35, according to the embodiment of the disclosure, in case that the UE transmits only some of segments after performing RRC segmentation for the MeasurementReportAppLayer message including measReportAppLayerContainer or appLayerSessionStatus, the remaining un-transmitted segments may be transmitted.

In operation 7-40, according to the embodiment of the disclosure, the UE may suspend transmission of a QoE reporting container (measReportAppLayerContainer) and appLayerSessionStatus. In addition, in operation 7-30, according to the embodiment of the disclosure, in case that the UE has not ever transmitted only some of segments after performing RRC segmentation for the MeasurementReportAppLayer message including measReportAppLayerContainer or appLayerSessionStatus (i.e., when there is no remaining segment), the UE may suspend transmission of the QoE container (measReportAppLayerContainer).

In operation 7-45, according to the embodiment of the disclosure, the UE may store container and appLayerSessionStatus to be received previously or to be received later.

According to the embodiment of the disclosure in case that the pauseReporting indicator is configured as false in operation 7-25, the UE may identify whether transmission of the QoE container and appLayerSessionStatus has ever been suspended in operation 7-50.

In operation 7-55, if the transmission of the QoE container and appLayerSessionStatus has ever been suspended, the UE may start transmission of the stored QoE container and appLayerSessionStatus.

In operation 7-60, the UE may resume transmission of the QoE container and appLayerSessionStatus.

In case that the UE has not ever suspended QoE container and appLayerSessionStatus transmission in operation 7-50, the UE may not perform any further operation in operation 7-65.

As described above, the operations of the disclosure provided through FIGS. 7A to 7B and related descriptions may be expressed as, for example, Tables 19 to 20 below.

TABLE 19

The UE may:
1>   if measConfigAppLayerToAddReleaseList is included in appLayerMeasConfig
within RRCReconfiguration or RRCResume:
    2>        for each measConfigAppLayerId value included in the
measConfigAppLayerToReleaseList:
        3>     forward the measConfigAppLayerId and inform upper layers
about the release of the application layer measurement configuration including any RAN
visible configuration;
        3>    discard any received application layer measurement report
received from upper layers;
        3>    consider itself not to be configured to send application layer
measurement report for the measConfigAppLayerId.
1>   if measConfigAppLayerToAddModList is included in appLayerMeasConfig
within RRCReconfiguration or RRCResume:
    2>        for each measConfigAppLayerId value included in the
measConfigAppLayerToAddModList:
        3>    if measConfigAppLayerContainer is included for the
corresponding MeasConfigAppLayer configuration:
            4>      forward the measConfigAppLayerContainer, the
measConfigAppLayerId and the serviceType to upper layers considering the serviceType;
        3>    consider itself to be configured to send application layer
measurement report for the measConfigAppLayerId;
        3>    forward the transmissionOfSessionStartStop, if received, to
upper layers;

TABLE 19-continued

3>    if ran-VisibleParameters is set to setup and the parameters have
been received;
      4>      forward the measConfigAppLayerId, the ran-
VisiblePeriodicity, the numberOfBufferLevelEntries and the reportInitialPlayOutDelay
to upper layers considering the serviceType;
      3>    else if ran-VisibleParameters is set to release:
      4>      forward the measConfigAppLayerId and inform
upper layers about the release of the RAN visible application layer measurement
configuration;
      3>    if pauseReporting is set to true:
      4>      if at least one segment, but not all segments, of a
segmented MeasurementReportAppLayer message containing an application layer
measurement report container or session start or stop information associated with the
measConfigAppLayerId has been submitted to lower layers for transmission:
         5>      submit the remaining segments of the
MeasurementReportAppLayer message to lower layers for transmission;
      4>      suspend submitting application layer measurement
report containers and session start or stop information to lower layers for the application
layer measurement configuration associated with the measConfigAppLayerId;
      4>      store any previously or subsequently received
application layer measurement report containers and session start or stop information
associated with the measConfigAppLayerId for which no segment, or full message, has
been submitted to lower layers for transmission;
      3>    else if pauseReporting is set to false and if transmission of
application layer measurement report containers and session start or stop information has
previously been suspended for the application layer measurement configuration
associated with the measConfigAppLayerId:
      4>      submit stored application layer measurement report
containers and session start or stop information to lower layers for the application layer
measurements configuration associated with the measConfigAppLayerId;
      4>      resume submitting application layer measurement
report containers and session start or stop information to lower layers for the application
layer measurement configuration associated with the measConfigAppLayerId;

NOTE 1:
The UE may discard reports when the memory reserved for storing application layer measurement reports becomes full.
NOTE 2:
The transmission of RAN visible reports is not paused when pauseReporting is set to true.

TABLE 20

AppLayerMeasConfig field descriptions measConfigAppLayerContainer

The field contains configuration of application layer measurements, see Annex L
(normative) in TS 26.247, clause 16.5 in TS 26.114 and TS 26.118.
numberOfBufferLevelEntries The field contains the maximum number of buffer level entries that can be reported for
RAN visible application layer measurements.
pauseReporting The field indicates whether the transmission of measReportAppLayerContainer and
appLayerSessionStatus is paused or not.
ran-VisiblePeriodicity The field indicates the periodicity of RAN visible reporting. Value ms120 indicates 120
ms, value ms240 indicates 240 ms and so on. If no value is indicated and the UE is config-
ured
with RAN visible reporting, the same periodicity as indicated in the
measConfigAppLayerContainer is used.
reportInitialPlayoutDelay The field indicates whether the UE shall report Initial Playout Delay for RAN visible
application layer measurements.
rrc-SegAllowed This field, when received in MeasConfigAappLayerMeasConfigList, indicates that RRC
segmentation of MeasurementReportAppLayer is allowed. It may be present only if the UE
supports RRC message segmentation.

TABLE 20-continued

| AppLayerMeasConfig field descriptions |
| --- |
| serviceType |
| Indicates the type of application layer measurement. Value streaming indicates Quality of Experience Measurement Collection for streaming services (see TS 26.247), value mtsi indicates Quality of Experience Measurement Collection for MTSI (see TS 26.114). value vr indicates Quality of Experience Measurement Collection for VR service (see TS 26.118). The network always configures serviceType when application layer measurements are initially configured and at fullConfig. |
| transmissionOfSessionStartStop |
| The field indicates whether the UE shall transmit indications when sessions in the application layer start and stop. The UE transmits a session start indication upon configuration of this field if a session already has started in the application layer. |

Figure 8A:
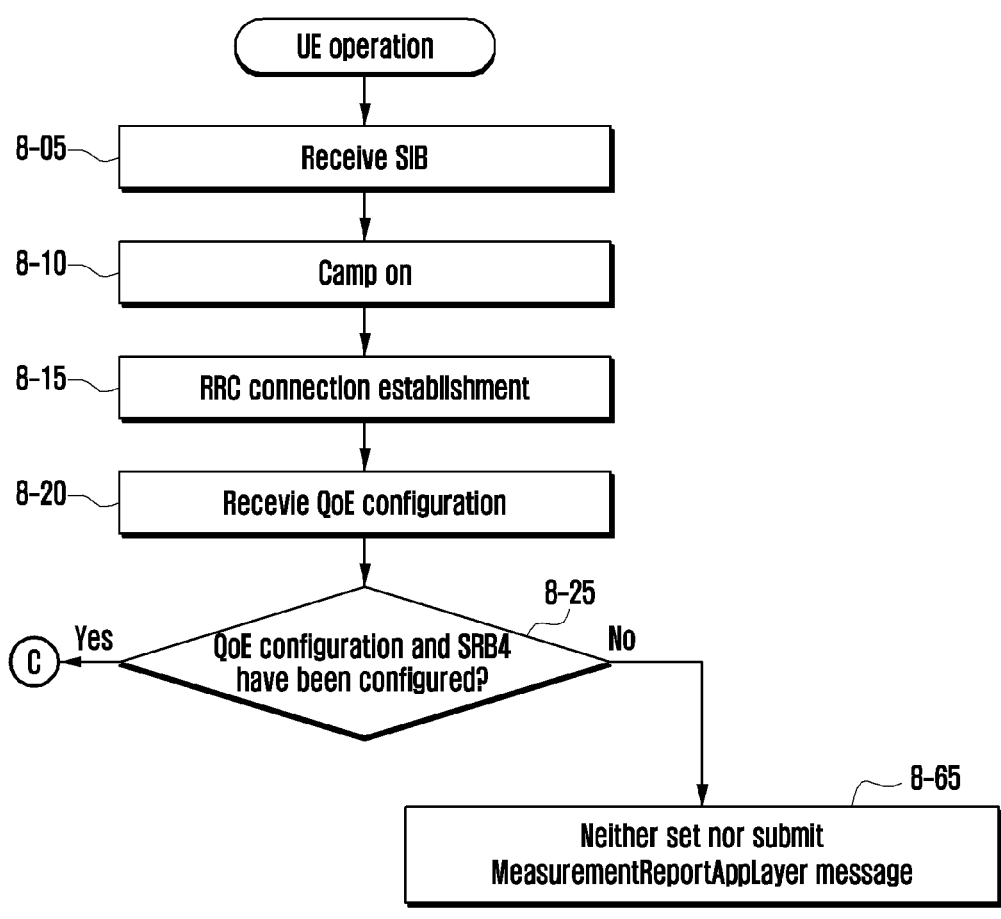
FIG. 8A illustrates a UE operation for reporting a QoE measurement result in case that an appLayerSessionStatus indicator is affected by a pauseReporting configuration according to an embodiment of the disclosure.
Figure 8B:
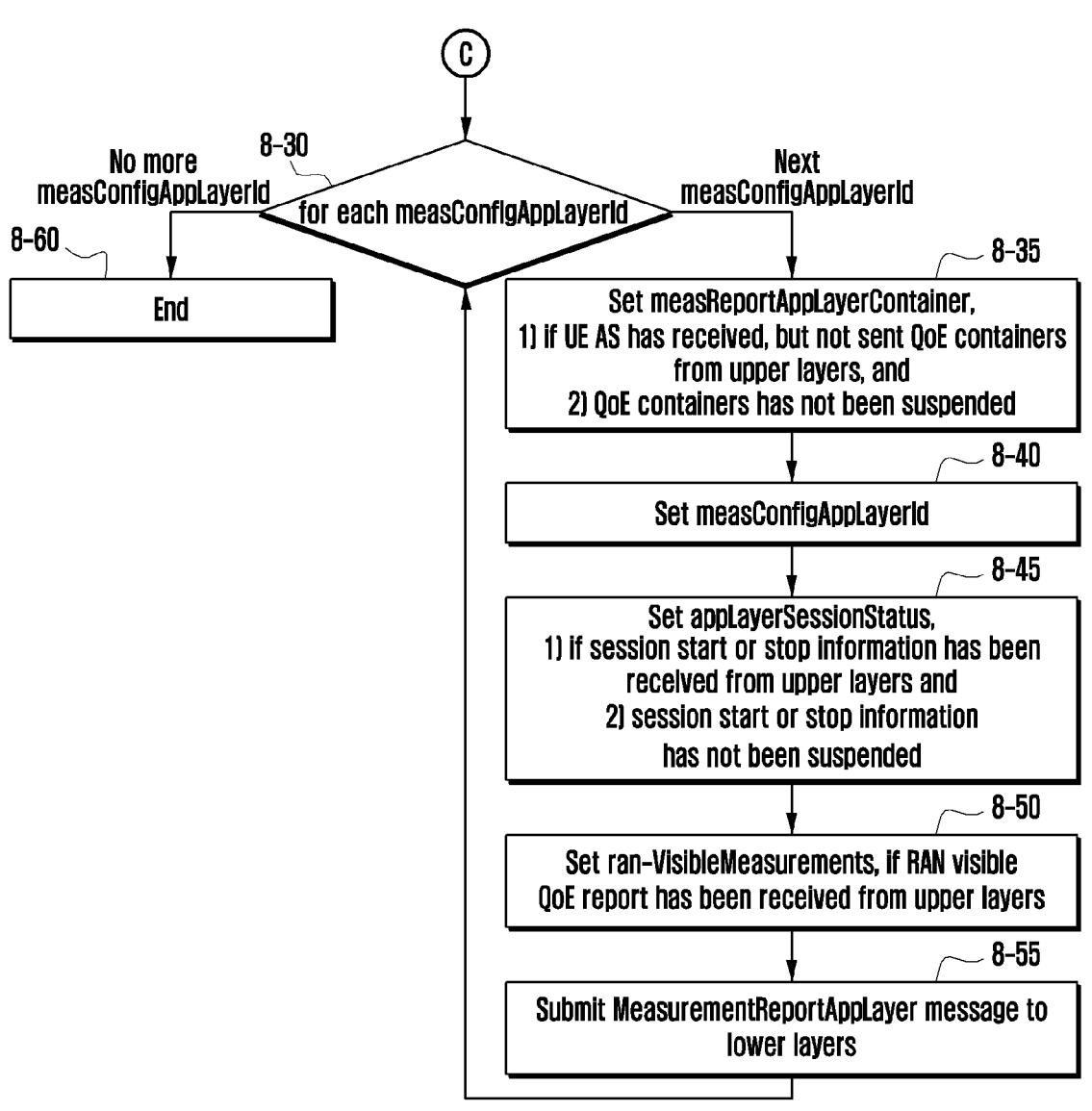
FIG. 8B illustrates a UE operation for reporting a QoE measurement result in case that an appLayerSessionStatus indicator is affected by a pauseReporting configuration according to an embodiment of the disclosure.

FIGS. 8A and 8B illustrate a UE operation for reporting a QoE measurement result in case that an appLayerSession-Status indicator is affected by a pauseReporting setting, as an example of an embodiment of the disclosure.

In operation 8-05, a UE may receive system information (SIB) transmitted by the base station.

In operation 8-10, the UE may camp on a specific base station or cell based on the received SIB.

In operation 8-15, the UE may establish an RRC connection with the camped-on cell or base station.

In operation 8-20, the UE in a connected mode may receive QoE configuration information from the base station. This QoE configuration information may be included in an RRCReconfiguration message and transmitted. Alternatively, a UE in an inactive mode may receive QoE configuration information through an RRCResume message.

In operation 8-25, the UE in the connected mode may determine whether QoE configuration and SRB4 for QoE report message transmission have been configured.

In operation 8-30, when the QoE configuration and SRB4 have been configured, the UE may repeatedly perform operations 8-35 to 8-55 for each measConfigAppLayerId to transmit a QoE report message (MeasurementReportApplayer).

In operation 8-35, according to the embodiment of the disclosure, when there is a QoE container (measReportAppLayerContainer) that the UE AS layer has received from the app layer but has not sent yet, and QoE container reporting has not been suspended, a QoE report container in a MeasurementReportAppLayer message (measReportAppLayerContainer) may be configured as QoE report information received from the app layer.

In operation 8-40, the UE AS layer may configure measConfigAppLayerId in the MeasurementReportAppLayer message as the measConfigAppLayerId having been received from the app layer together with the QoE measurement result.

In operation 8-45, according to the embodiment of the disclosure, in case that the UE AS layer has received session measurement start and stop information (appLayerSession-Status) from the app layer and the transmission of appLayerSessionStatus has not been suspended, the UE may configure appLayerSessionStatus in the MeasurementReportAppLayer message as the received value.

In operation 8-50, in case that the UE AS layer has received the RAN visible QoE measurement result from the app layer, the UE may configure ran-VisibleMeasurements in the MeasurementReportAppLayer message as the received value.

In operation 8-55, the UE may transmit the MeasurementReportAppLayer message.

In case that operations for all the measConfigAppLayerId end in operation 8-30, the UE operation may be ended in operation 8-60.

In case that the QoE configuration or SRB4 is not configured in operation 8-25, the UE may neither configure nor transmit the MeasurementReportAppLayer message in operation 8-65.

As described above, the operation of the disclosure provided through FIGS. 8A to 8B and related descriptions may be expressed as, for example, Table 21 below.

TABLE 21

| A UE capable of application layer measurement reporting in RRC_CONNECTED may initiate the procedure when configured with application layer measurement, i.e., when appLayerMeasConfig and SRB4 have been configured by the network. |
| --- |
| Upon initiating the procedure, the UE may: |
| 1>    for each measConfigAppLayerId: |
|         2>    if the UE AS has received, but not sent, application layer measurement report containers from upper layers; and |
|         2>    if submitting application layer measurement report containers has not been suspended for the measConfigAppLayerId associated with the application layer measurement report: |
|                 3>    set the measReportAppLayerContainer in the MeasurementReportAppLayer message to the received value of the application layer measurement report; |
|         2>    set the measConfigAppLayerId in the MeasurementReportAppLayer message to the value of the measConfigAppLayerId received together with application layer measurement report information; |
|         2>    if session start or stop information has been received from upper layers for the measConfigAppLayerId; and |
|         2>    if submitting session start or stop information has not been suspended for the measConfigAppLayerId associated with the application layer measurement report: |

US 12,581,335 B2

31 32

TABLE 21-continued

```
        3>      set the appLayerSessionStatus to the received value of the application
layer measurement information;
        2>      if RAN visible application layer measurement report has been received from
upper layers:
        3>      for each appLayerBufferLevel value in the received RAN visible
application layer measurement report:
                4> set the appLayerBufferLevel values in the
appLayerBufferLevelLIst to the buffer level values received from the upper layer in the order
with the first appLayerBufferLevel value set to the newest received buffer level value, the
second appLayerBufferLevel value set to the second newest received buffer level value, and so
on until all the buffer level values received from the upper layer have been assigned or the
configured maximum number of appLayerBufferLevel values have been set, if any;
        3>      set the initialPlayoutDelay to the received value in the RAN visible
application layer measurement report, if any;
        3>      for each PDU session ID value indicated in the received RAN visible
application layer measurement report, if any:
                4> set the PDU-SessionID field in the pdu-SessionIdList to the
indicated PDU session ID value;
        2>      if the RRC message segmentation is enabled based on the field rrc-
SegAllowed received in appLayerMeasConfig, and the encoded RRC message is larger than the
maximum supported size of a PDCP SDU:
        3>      initiate the UL message segment transfer procedure;
        2>      else:
        3>      submit the MeasurementReportAppLayer message to lower layers
for transmission upon which the procedure ends.
```

A problem to be solved by the disclosure is that the UE is able to generate and transmit a MeasurementReportAppLayer message for each measConfigAppLayerId (in operation 6-30). In case that the UE receives multiple pieces of QoE configuration information from the base station, the UE may generate a QoE measurement result report for each measConfigAppLayerId (QoE configuration information ID). The QoE measurement result report (e.g., measReportAppLayerContainer, appLayerSession Status, ran-VisibleMeasurements) generated for each measConfigAppLayerId may be included in one MeasurementReportAppLayer message and transmitted. That is, multiple MeasurementReportAppLayer messages are generated for multiple measConfigAppLayerIds, and the UE may transmit multiple MeasurementReportAppLayer messages.

In case that a single QoE measurement result report is received from the app layer with respect to one measConfigAppLayerId, the UE may transmit the MeasurementReportAppLayer message while only one entry (MeasurementReportAppLayer-r17-IEs) in measurementReportAppLayerList within one MeasurementReportAppLayer message contains the QoE measurement result.

In case that multiple QoE measurement result reports are received from the app layer with respect to one measConfigAppLayerId, the UE may include reporting of multiple QoE measurement results to the multiple MeasurementReportAppLayer-r17-IEs while each entry (MeasurementReportAppLayer-r17-IEs) in measurementReportAppLayerList within one MeasurementReportAppLayer message includes the same measConfigAppLayerId. That is, the UE may include a plurality of MeasurementReportAppLayer-r17-IEs configured with the same measConfigAppLayerId in one MeasurementReportAppLayer message and transmit the same to the base station.

Considering that the measurementReportAppLayerList in the MeasurementReportAppLayer message may include multiple MeasurementReportAppLayer-r17-IEs, it may be inefficient to include only the QoE measurement result report configured by the same measConfigAppLayerId in the MeasurementReportAppLayer message. That is, in case that reporting of QoE measurement results for multiple measConfigAppLayerIds occurs, generating/configuring/transmitting multiple MeasurementReportAppLayer messages (of the same number as that of the measConfigAppLayerIds) may cause waste in the computing capability use and power use of the UE and the base station, not only in terms of radio resource use but also in generating/processing/transmitting or receiving multiple messages. In order to solve the above problem, the disclosure proposes a method enabling QoE measurement result reports for multiple measConfigAppLayerIds to be included in one MeasurementReportAppLayer message, and this can be seen as more efficient in terms of radio resource use, computing capability use, and power use of the UE and the base station.

Figure 9A:
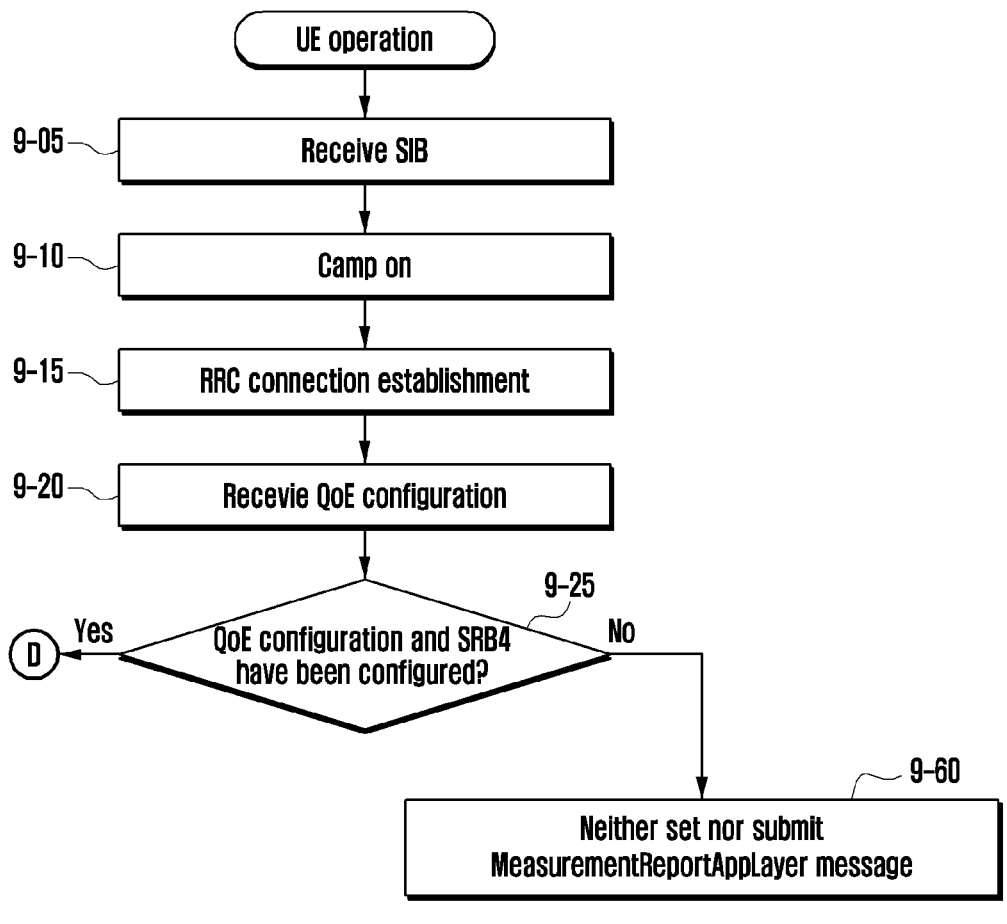
FIG. 9A illustrates a UE operation for reporting a QoE measurement result according to an embodiment of the disclosure.
Figure 9B:
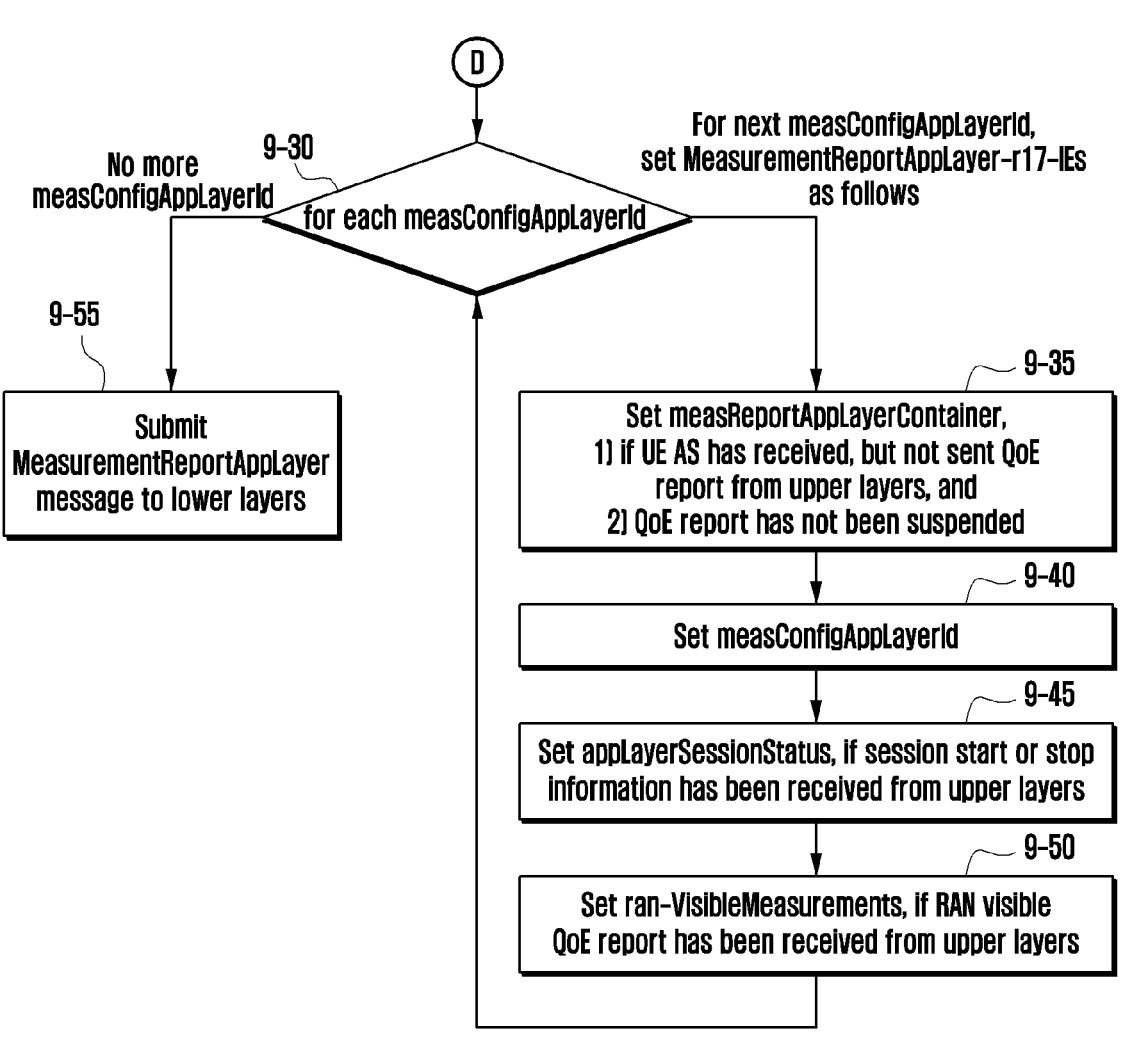
FIG. 9B illustrates a UE operation for reporting a QoE measurement result according to an embodiment of the disclosure.

FIGS. 9A and 9B illustrate a UE operation for reporting a QoE measurement result according to an embodiment of the disclosure.

FIGS. 9A and 9B illustrate example methods that can be implemented in accordance with the principles of the present disclosure and various changes could be made to the methods illustrated in the flowcharts herein. For example, while shown as a series of operations, various operations in each figure could overlap, occur in parallel, occur in a different order, or occur multiple times. In another example, operations may be omitted or replaced by other operations.

In operation 9-05, a UE may receive system information (SIB) transmitted by the base station.

In operation 9-10, the UE may camp on a specific base station or cell based on the received SIB.

In operation 9-15, the UE may establish an RRC connection with the camped-on cell or base station.

In operation 9-20, the UE in a connected mode may receive QoE configuration information from the base station. This QoE configuration information may be included in an RRCReconfiguration message and transmitted. Alternatively, a UE in an inactive mode may receive QoE configuration information through an RRCResume message.

In operation 9-25, the UE in the connected mode may determine whether QoE configuration and SRB4 for QoE report message transmission have been configured.

In operation 9-30, when the QoE configuration and SRB4 have been configured according to the embodiment of the disclosure, the UE may repeatedly perform operations 9-35 to 9-50 for each measConfigAppLayerId to transmit a QoE report message (MeasurementReportAppLayer). According to parameter configuration operations for each measConfigAppLayerId in operations 9-35 to 9-50, each MeasurementReportAppLayer-r17-IEs may be configured within the same MeasurementReportAppLayer message. According to repetitive parameter configuration operations for a plurality of measConfigAppLayerId in operations 9-35 to 9-50, a plurality of MeasurementReportAppLayer-r17-IEs may be configured within the same MeasurementReportAppLayer message.

In operation 9-35, when there is a QoE container (measReportAppLayerContainer) that the UE AS layer has received from the app layer but has not sent yet, and QoE container reporting has not been suspended, a QoE report container in a MeasurementReportAppLayer message (measReportAppLayerContainer) may be configured as QoE report information received from the app layer.

In operation 9-40, the UE AS layer may configure measConfigAppLayerId in the MeasurementReportAppLayer message as the measConfigAppLayerId having been received from the app layer together with the QoE measurement result.

In operation 9-45, in case that the UE AS layer has received session measurement start and stop information from the app layer, the UE may configure appLayerSessionStatus in the MeasurementReportAppLayer message as the received value.

In operation 9-50, in case that the UE AS layer has received the RAN visible QoE measurement result from the app layer, the UE may configure ran-VisibleMeasurements in the MeasurementReportAppLayer message as the received value.

According to the embodiment of the disclosure, operations for all the measConfigAppLayerId end in operation 9-30, the UE may transmit a MeasurementReportAppLayer message in operation 9-55. For a plurality of measConfigAppLayerId, only a single MeasurementReportAppLayer message may be configured and transmitted.

In case that the QoE configuration or SRB4 is not configured in operation 9-25, the UE may neither configure nor transmit the MeasurementReportAppLayer message in operation 9-60.

As described above, the operation of the disclosure provided through FIGS. 9A to 9B and related descriptions may be expressed as, for example, Table 22 below.

TABLE 22

A UE capable of application layer measurement reporting in RRC_CONNECTED may initiate
the procedure when configured with application layer measurement, i.e., when
appLayerMeasConfig and SRB4 have been configured by the network.
Upon initiating the procedure, the UE may:
1>      for each measConfigAppLayerId, an entry of measurementReportAppLayerList is set
as follows:
        2>      if the UE AS has received, but not sent, application layer measurement report
from upper layers; and
        2>      if the application layer measurement reporting has not been suspended for the
measConfigAppLayerId associated with the application layer measurement report:
                3>      set the measReportAppLayerContainer in the
MeasurementReportAppLayer message to the received value of the application layer
measurement report;
        2>      set the measConfigAppLayerId in the MeasurementReportAppLayer message
to the value of the measConfigAppLayerId received together with application layer
measurement report information;
        2>      if session start or stop information has been received from upper layers for the
measConfigAppLayerId:
                3>      set the appLayerSessionStatus to the received value of the application
layer measurement information;
        2>      if RAN visible application layer measurement report has been received from
upper layers:
                3>      for each appLayerBufferLevel value in the received RAN visible
application layer measurement report:
                        4> set the appLayerBufferLevel values in the
appLayerBufferLevelLIst to the buffer level values received from the upper layer in the order
with the first appLayerBufferLevel value set to the newest received buffer level value, the
second appLayerBufferLevel value set to the second newest received buffer level value, and so
on until all the buffer level values received from the upper layer have been assigned or the
configured maximum number of appLayerBufferLevel values have been set, if any;
                3>      set the initialPlayoutDelay to the received value in the RAN visible
application layer measurement report, if any;
                3>      for each PDU session ID value indicated in the received RAN visible
application layer measurement report, if any:
                        4> set the PDU-SessionID field in the pdu-SessionIdList to the
indicated PDU session ID value;
1>      if the RRC message segmentation is enabled based on the field rrc-SegAllowed
received in appLayerMeasConfig, and the encoded RRC message is larger than the maximum
supported size of a PDCP SDU:
        2>      initiate the UL message segment transfer procedure;
1>      else:
        2>      submit the MeasurementReportAppLayer message to lower layers for
transmission upon which the procedure ends.

Another problem to be solved by the disclosure is that MeasurementReportAppLayer-r17-IEs in the MeasurementReportAppLayer message transmitted by a UE may include only measConfigAppLayerId. The measReportAppLayerContainer is an optional field, and in case that there is no QoE report that the UE AS layer has received from the app layer but has not sent yet or the QoE report has been suspended in operation 6-35, the measReportAppLayerContainer may not be included in the MeasurementReportAppLayer-r17-IEs. The measConfigAppLayerId is a mandatory field and thus may always be included in MeasurementReportAppLayer-r17-IEs in operations 6-40. The appLayerSessionStatus is an optional field, and in case that the UE AS layer has not ever received session measurement start and stop information from the app layer in operation 6-45, the appLayerSessionStatus may not be included in MeasurementReportAppLayer-r17-IEs. The ran-VisibleMeasurements is an optional field, and in case that the UE AS layer has not ever received a RAN visible QoE measurement result from the app layer in operation 6-50, the ran-VisibleMeasurements may not be included in MeasurementReportAppLayer-r17-IEs. As a result, MeasurementReportAppLayer-r17-IEs in the MeasurementReportAppLayer message transmitted by the UE may include only measConfigAppLayerId. Reporting only measConfigAppLayerId without meaningful QoE information (measReportAppLayerContainer, appLayerSessionStatus, or ran-VisibleMeasurements) at the time of reporting the QoE measurement result to the base station by the UE may waste radio resources, computing resources of the UE and the base station, and energy consumption. This is because the base station may know QoE configuration Id (measConfigAppLayerId) having been configured for the corresponding UE. Since measConfigAppLayerId is an indicator indicating which QoE configuration the meaningful QoE information is generated by, transmission to the base station without the meaningful QoE information may be inefficient. In addition, a QoE report generated thereby may be transmitted from the base station to TCE or OAM, and thus resources of the core network may also be wasted.

In order to solve the above problem, the disclosure proposes that at least one other parameter (measReportAppLayerContainer, appLayerSessionStatus, or ran-VisibleMeasurements) is included, in addition to measConfigAppLayerId, in MeasurementReportAppLayer-r17-IEs, and transmitted to the base station.

As another embodiment, in order to prevent the UE AS layer from receiving appLayerSessionStatus too frequently from the app layer and generating and transmitting too frequent QoE reports, at least one other parameter (measReportAppLayerContainer or ran-VisibleMeasurements) is included, in addition to measConfigAppLayerId and appLayerSessionStatus, in MeasurementReportAppLayer-r17-IEs, and transmitted to the base station.

Figure 10A:
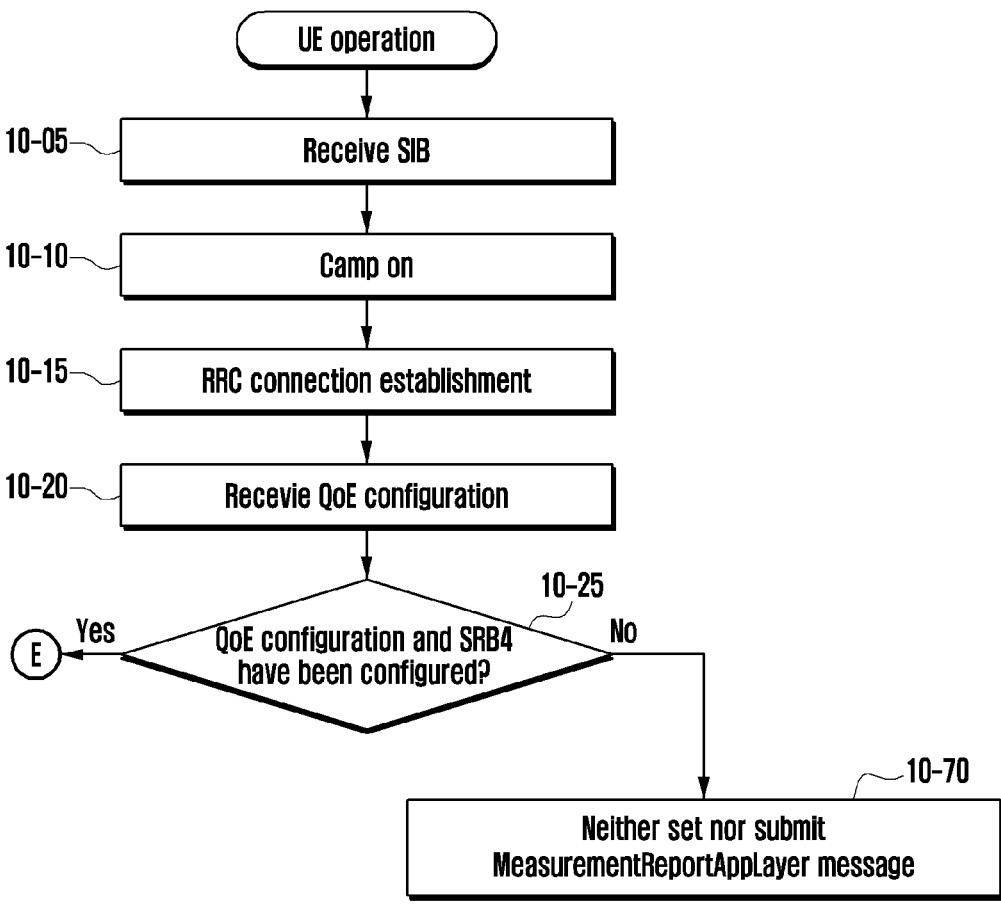
FIG. 10A illustrates a UE operation for reporting a QoE measurement result according to an embodiment of the disclosure.
Figure 10B:
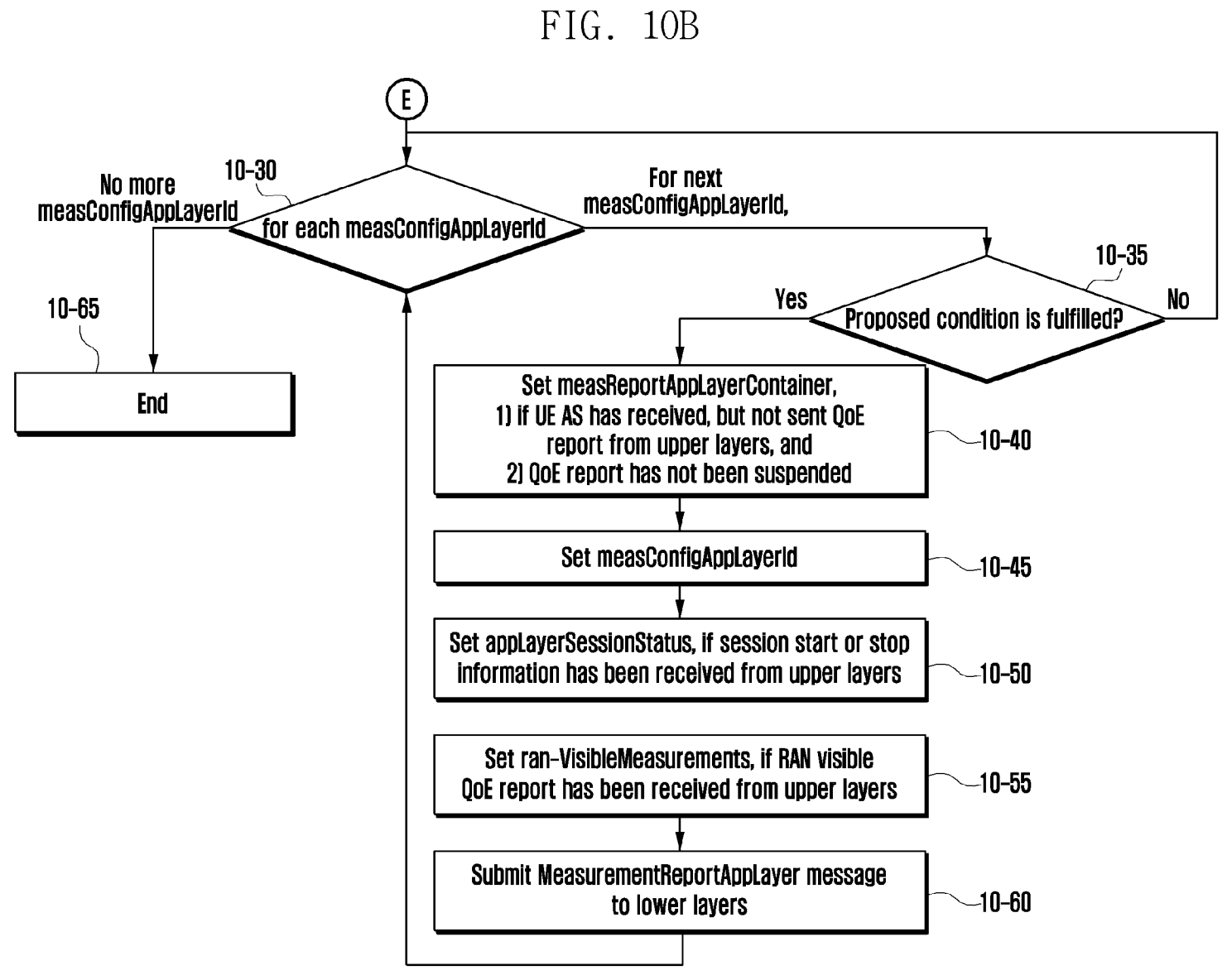

FIGS. 10A and 10B illustrate a UE operation for reporting a QoE measurement result according to an embodiment of the disclosure.

FIGS. 10A and 10B illustrate example methods that can be implemented in accordance with the principles of the present disclosure and various changes could be made to the methods illustrated in the flowcharts herein. For example, while shown as a series of operations, various operations in each figure could overlap, occur in parallel, occur in a different order, or occur multiple times. In another example, operations may be omitted or replaced by other operations.

In operation 10-05, a UE may receive system information (SIB) transmitted by a base station.

In operation 10-10, the UE may camp on a specific base station or cell based on the received SIB.

In operations 10-15, the UE may establish an RRC connection with the camped-on cell or base station.

In operation 10-20, the UE in a connected mode may receive QoE configuration information from the base station. This QoE configuration information may be included in the RRCReconfiguration message and transmitted. Alternatively, a UE in an inactive mode may receive QoE configuration information through an RRCResume message.

In operation 10-25, the UE in the connected mode may determine whether QoE configuration and SRB4 for QoE report message transmission have been configured.

In operation 10-30, according to the embodiment of the disclosure, when QoE configuration and SRB4 are configured, the UE may repeatedly perform operations 10-35 to 10-60 for each measConfigAppLayerId to transmit a QoE report message (MeasurementReportAppLayer).

In operation 10-35, the UE may determine whether provided conditions are satisfied according to the embodiment of the disclosure. The provided conditions may include some or all of the following conditions. Here, "OR" condition may be used between the following conditions:

1) Condition of including measReportAppLayerContainer: When there is a QoE report that the UE AS layer has received from the app layer but has not sent yet, and the QoE report has not been suspended;

2) Condition of including AppLayerSessionStatus: when the UE AS layer has received session measurement start and stop information from the app layer; and/or 3) Condition of including ran-VisibleMeasurements: when the UE AS layer has received the RAN visible QoE measurement result from the app layer.

As an embodiment of the disclosure, when all three conditions are included as the provided conditions, 1) when there is a QoE report that the UE AS layer has received from the app layer but has not sent yet, and the QoE report has not been suspended, or 2) when the UE AS layer has received session measurement start and stop information from the app layer, or 3) when the UE AS layer has received the RAN visible QoE measurement result from the app layer, operation may proceed to operation 10-40. As a result, measReportAppLayerContainer and/or appLayerSessionStatus and/or ran-VisibleMeasurements may be included in operations 10-40, 10-50, and 10-55.

As an embodiment of the disclosure, when only the first and third conditions are included as provided conditions, 1) when there is a QoE report that the UE AS layer has received from the app layer but has not sent yet, and the QoE report has not been suspended, or 3) when the UE AS layer has received the RAN visible QoE measurement result from the app layer, the provided condition is satisfied and operation may proceed to operation 10-40. As a result, measReportAppLayerContainer and/or ran-VisibleMeasurements may be included in operations 10-40 and 10-55.

If the provided condition is not satisfied, the UE operation may proceed to operation 10-30.

In operation 10-40, when there is a QoE report that the UE AS layer has received from the app layer but has not sent yet, and the QoE report has not been suspended, the QoE report container (measReportAppLayerContainer) in the MeasurementReportAppLayer message may be configured as QoE report information having been received from the app layer.

In operation 10-45, the UE AS layer may configure measConfigAppLayerId in the MeasurementReportAppLayer message as the measConfigAppLayerId having been received from the app layer together with the QoE measurement result.

In operation 10-50, in case that the UE AS layer has received session measurement start and stop information from the app layer, the UE may configure appLayerSession-Status in the MeasurementReportAppLayer message as the received value.

In operation 10-55, in case that the UE AS layer has received a RAN visible QoE measurement result from the app layer, the UE may configure ran-VisibleMeasurements in the MeasurementReportAppLayer message as the received value.

In operation 10-60, the UE may transmit the MeasurementReportAppLayer message.

In case that operations for all the measConfigAppLayerIds end in operation 10-30, the UE operation may be ended in operation 10-65.

In case that the QoE configuration or SRB4 is not configured in operation 10-25, the UE may neither configure nor transmit the MeasurementReportAppLayer message in operation 10-70.

As described above, the operation of the disclosure provided through FIGS. 10A to 10B and related descriptions may be expressed as, for example, Table 23 below.

TABLE 23

A UE capable of application layer measurement reporting in RRC_CONNECTED may initiate the procedure when configured with application layer measurement, i.e., when appLayerMeasConfig and SRB4 have been configured by the network.
Upon initiating the procedure, the UE may:
1>     for each measConfigAppLayerId:
       2>     An entry of measurementReportAppLayerList is set as follows, if the UE AS has received, but not sent, application layer measurement report (while the application layer measurement reporting has not been suspended), session start or stop information, or RAN visible application layer measurement report from upper layers:
              3>     if the UE AS has received, but not sent, application layer measurement report from upper layers; and
              3>     if the application layer measurement reporting has not been suspended for the measConfigAppLayerId associated with the application layer measurement report:
                     4>     set the measReportAppLayerContainer in the MeasurementReportAppLayer message to the received value of the application layer measurement report;
                     3>     set the measConfigAppLayerId in the MeasurementReportAppLayer message to the value of the measConfigAppLayerId received together with application layer measurement report information;
              3>     if session start or stop information has been received from upper layers for the measConfigAppLayerId:
                     4>     set the appLayerSessionStatus to the received value of the application layer measurement information;
              3>     if RAN visible application layer measurement report has been received from upper layers:
                     4>     for each appLayerBufferLevel value in the received RAN visible application layer measurement report:
                            5> set the appLayerBufferLevel values in the appLayerBufferLevelLIst to the buffer level values received from the upper layer in the order with the first appLayerBufferLevel value set to the newest received buffer level value, the second appLayerBufferLevel value set to the second newest received buffer level value, and so on until all the buffer level values received from the upper layer have been assigned or the configured maximum number of appLayerBufferLevel values have been set, if any;
                     4>     set the initialPlayoutDelay to the received value in the RAN visible application layer measurement report, if any;
                     4>     for each PDU session ID value indicated in the received RAN visible application layer measurement report, if any:
                            5> set the PDU-SessionID field in the pdu-SessionIdList to the indicated PDU session ID value;
       2>     if the RRC message segmentation is enabled based on the field rrc-SegAllowed received in appLayerMeasConfig, and the encoded RRC message is larger than the maximum supported size of a PDCP SDU:
              3>     initiate the UL message segment transfer procedure;
       2>     else:
              3>     submit the MeasurementReportAppLayer message to lower layers for transmission upon which the procedure ends.

The provided conditions in operation 10-35 may be modified in various embodiments as described above.

Another embodiment may allow a case where MeasurementReportAppLayer-r17-IEs includes only measConfigAppLayerId. However, this case may be defined as indicating that the UE has a QoE configuration for the corresponding measConfigAppLayerId, but there is no QoE measurement result to be reported or related information.

40

Figure 11A:
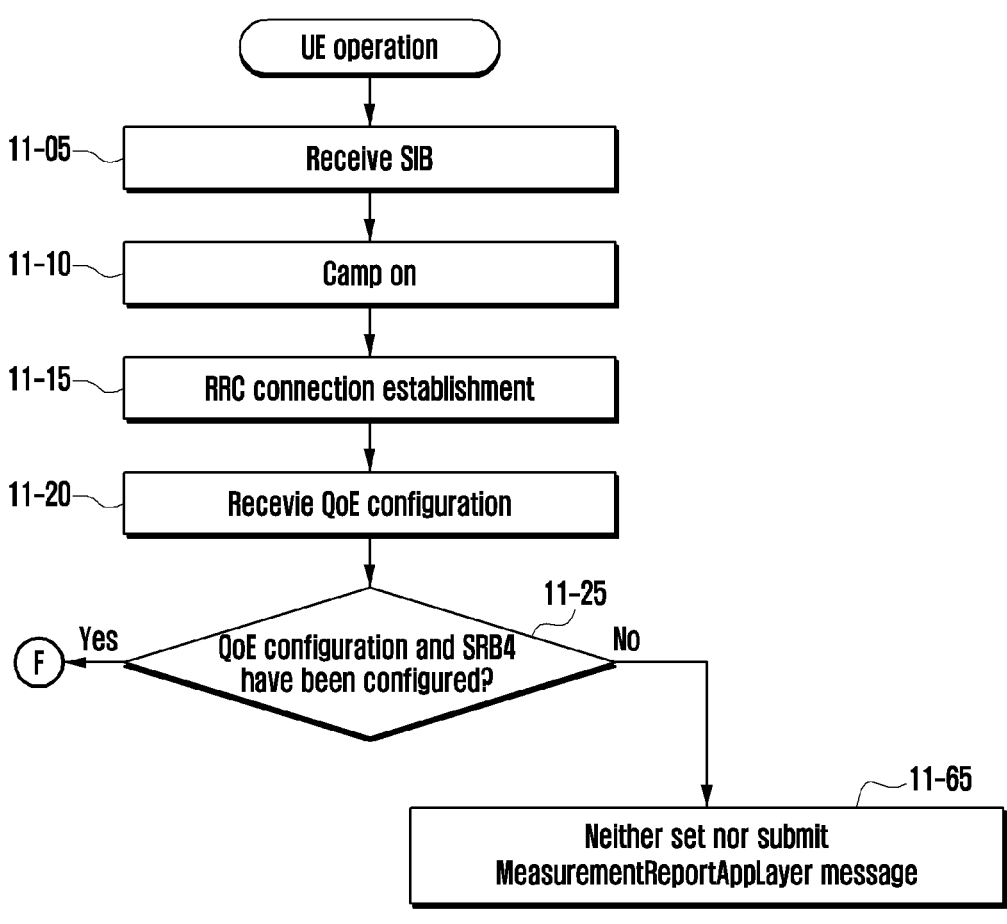
FIG. 11A illustrates a UE operation for reporting a QoE measurement result according to an embodiment of the disclosure.
Figure 11B:
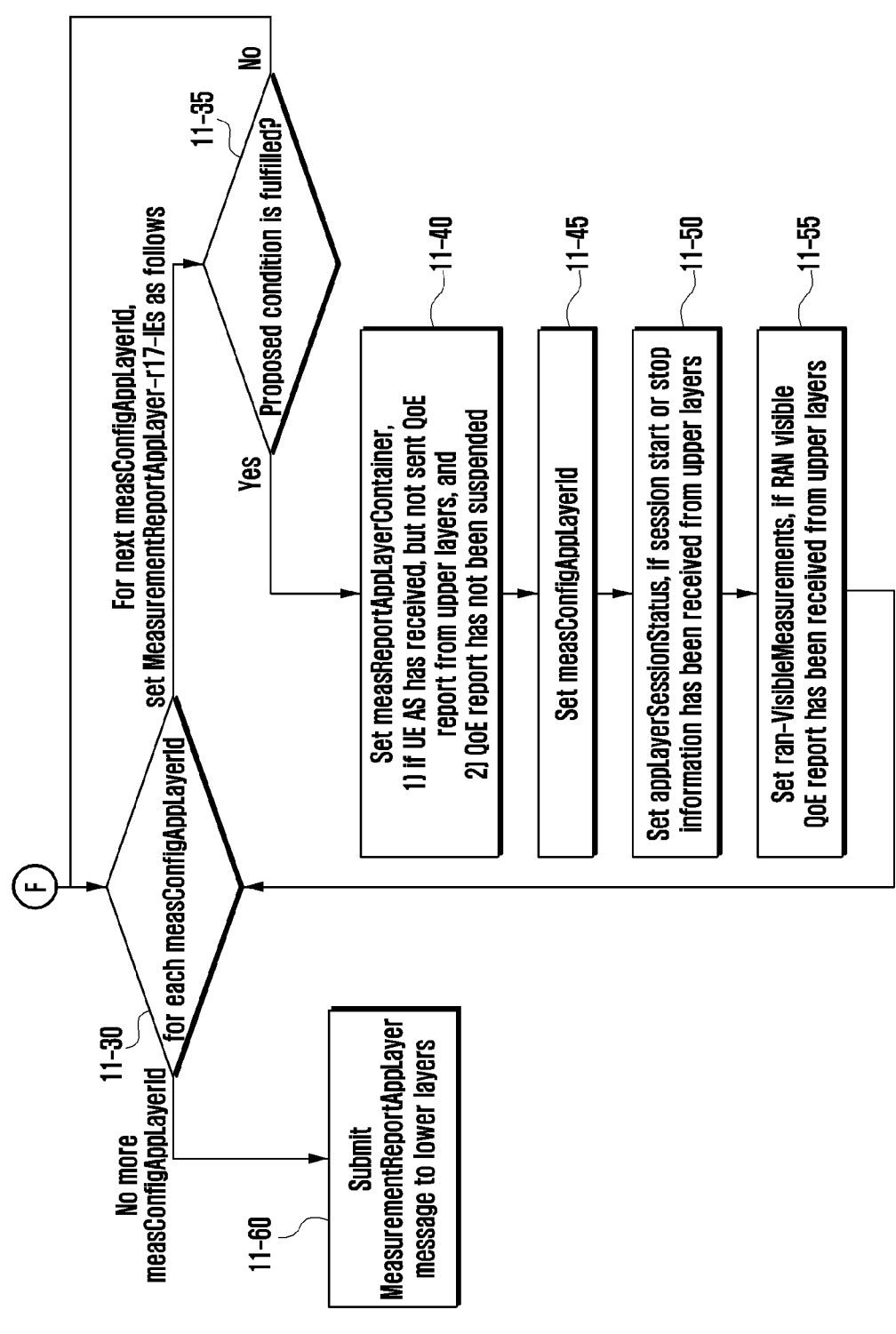
FIG. 11B illustrates a UE operation for reporting a QoE measurement result according to an embodiment of the disclosure.

FIGS. 11A and 11B illustrate a UE operation for reporting a QoE measurement result according to an embodiment of the disclosure.

FIGS. 11A to 11B are a combination of FIGS. 9A to 9B and 10A to 10B, and detailed descriptions of each operation may refer to the descriptions of FIGS. 9A to 9B and 10A to 10B.

The operation of the disclosure provided through FIGS. 11A and 11B may be expressed as, for example, Table 24 below.

TABLE 24

A UE capable of application layer measurement reporting in RRC_CONNECTED may initiate the procedure when configured with application layer measurement, i.e., when appLayerMeasConfig and SRB4 have been configured by the network.
Upon initiating the procedure, the UE may:
1>      for each measConfigAppLayerId:
      2>    An entry of measurementReportAppLayerList is set as follows, if the UE AS has received, but not sent, application layer measurement report (while the application layer measurement reporting has not been suspended), session start or stop information, or RAN visible application layer measurement report from upper layers:
            3>    if the UE AS has received, but not sent, application layer measurement report from upper layers; and
            3>    if the application layer measurement reporting has not been suspended for the measConfigAppLayerId associated with the application layer measurement report:
                4>    set the measReportAppLayerContainer in the MeasurementReportAppLayer message to the received value of the application layer measurement report;
            3>    set the measConfigAppLayerId in the MeasurementReportAppLayer message to the value of the measConfigAppLayerId received together with application layer measurement report information;
            3>    if session start or stop information has been received from upper layers for the measConfigAppLayerId:
                4>    set the appLayerSessionStatus to the received value of the application layer measurement information;
            3>    if RAN visible application layer measurement report has been received from upper layers:
                4>    for each appLayerBufferLevel value in the received RAN visible application layer measurement report:
                    5> set the appLayerBufferLevel values in the appLayerBufferLevelLIst to the buffer level values received from the upper layer in the order with the first appLayerBufferLevel value set to the newest received buffer level value, the second appLayerBufferLevel value set to the second newest received buffer level value, and so on until all the buffer level values received from the upper layer have been assigned or the configured maximum number of appLayerBufferLevel values have been set, if any;
                4>    set the initialPlayoutDelay to the received value in the RAN visible application layer measurement report, if any;
                4>    for each PDU session ID value indicated in the received RAN visible application layer measurement report, if any:
                    5> set the PDU-SessionID field in the pdu-SessionIdList to the indicated PDU session ID value;
1>      if the RRC message segmentation is enabled based on the field rrc-SegAllowed received in appLayerMeasConfig, and the encoded RRC message is larger than the maximum supported size of a PDCP SDU:
      2>    initiate the UL message segment transfer procedure;
1>      else:
      2>    submit the MeasurementReportAppLayer message to lower layers for transmission upon which the procedure ends.

As another embodiment of the disclosure, the operation of the disclosure provided through FIGS. 11A to 11B may be expressed as, for example, Table 25 below.

TABLE 25

A UE capable of application layer measurement reporting in RRC_CONNECTED may initiate the procedure when configured with application layer measurement, i.e., when appLayerMeasConfig and SRB4 have been configured by the network.
Upon initiating the procedure, the UE may:
1>      for each measConfigAppLayerId, each entry of measurementReportAppLayerList is set as follows:
      2>    if the UE AS has received, but not sent, application layer measurement report from upper layers; and TABLE 25-continued 2>    if the application layer measurement reporting has not been suspended
for the measConfigAppLayerId associated with the application layer measurement report:
        3>    set the measReportAppLayerContainer in the
MeasurementReportAppLayer message to the received value of the application layer
measurement report;
    2>    set the measConfigAppLayerId in the MeasurementReportAppLayer
message to the value of the measConfigAppLayerId received together with application
layer measurement report information;
    2>    if session start or stop information has been received from upper layers
for the measConfigAppLayerId:
        3>    set the appLayerSessionStatus to the received value of the
application layer measurement information;
    2>    if RAN visible application layer measurement report has been received
from upper layers:
        3>    for each appLayerBufferLevel value in the received RAN
visible application layer measurement report:
            4> set the appLayerBufferLevel values in the
appLayerBufferLevelLIst to the buffer level values received from the upper layer in the
order with the first appLayerBufferLevel value set to the newest received buffer level
value, the second appLayerBufferLevel value set to the second newest received buffer
level value, and so on until all the buffer level values received from the upper layer have
been assigned or the configured maximum number of appLayerBufferLevel values have
been set, if any;
        3>    set the initialPlayoutDelay to the received value in the RAN
visible application layer measurement report, if any;
        3>    for each PDU session ID value indicated in the received RAN
visible application layer measurement report, if any:
            4> set the PDU-SessionID field in the pdu-SessionIdList
to the indicated PDU session ID value;
    2>    if only measConfigAppLayerId is set and included in the entry of
measurementReportAppLayerList:
        3>    the entry of measurementReportAppLayerList is removed in
the measurementReportAppLayerList.
    2>    else:
        3>    the entry of measurementReportAppLayerList is included in the
measurementReportAppLayerList.
1>    if the RRC message segmentation is enabled based on the field rrc-SegAllowed
received in appLayerMeasConfig, and the encoded RRC message is larger than the
maximum supported size of a PDCP SDU:
    2>    initiate the UL message segment transfer procedure;
1>    else:
    2>    submit the MeasurementReportAppLayer message to lower layers for
transmission upon which the procedure ends.

That is, after operation 11-55 in FIGS. 11A and 11B, a method in which MeasurementReportAppLayer-r17-IEs including only measConfigAppLayerId (and/or appLayerSessionStatus) is removed in the MeasurementReportAppLayer message may be used.

As another embodiment of the disclosure, the operation of the disclosure provided through FIGS. 11A to 11B may be expressed as, for example, Table 26 below.

TABLE 26

A UE capable of application layer measurement reporting in RRC_CONNECTED may initiate
the procedure when configured with application layer measurement, i.e., when
appLayerMeasConfig and SRB4 have been configured by the network.
Upon initiating the procedure, the UE may:
1>    for each measConfigAppLayerId, each entry of measurementReportAppLayerList is
set as follows:
    2>    if the UE AS has received, but not sent, application layer measurement report
from upper layers; and
    2>    if the application layer measurement reporting has not been suspended for the
measConfigAppLayerId associated with the application layer measurement report:
        3>    set the measReportAppLayerContainer in the
MeasurementReportAppLayer message to the received value of the application layer
measurement report;
    2>    set the measConfigAppLayerId in the MeasurementReportAppLayer message
to the value of the measConfigAppLayerId received together with application layer
measurement report information;
    2>    if session start or stop information has been received from upper layers for the
measConfigAppLayerId:
        3>    set the appLayerSessionStatus to the received value of the application
layer measurement information;

TABLE 26-continued

```
          2>      if RAN visible application layer measurement report has been received from
upper layers:
                  3>       for each appLayerBufferLevel value in the received RAN visible
application layer measurement report:
                           4> set the appLayerBufferLevel values in the
appLayerBufferLevelLIst to the buffer level values received from the upper layer in the order
with the first appLayerBufferLevel value set to the newest received buffer level value, the
second appLayerBufferLevel value set to the second newest received buffer level value, and so
on until all the buffer level values received from the upper layer have been assigned or the
configured maximum number of appLayerBufferLevel values have been set, if any;
                  3>       set the initialPlayoutDelay to the received value in the RAN visible
application layer measurement report, if any;
                  3>       for each PDU session ID value indicated in the received RAN visible
application layer measurement report, if any:
                           4> set the PDU-SessionID field in the pdu-SessionIdList to the
indicated PDU session ID value;
NOTE: The entries of measurementReportAppLayerList which includes only
measConfigAppLayerId are not included in measurementReportAppLayerList.
          2>      if only measConfigAppLayerId is set and included in the entry of
measurementReportAppLayerList:
                  3>       the entry of measurementReportAppLayerList is removed in
the measurementReportAppLayerList.
          2>      else:
                  3>       the entry of measurementReportAppLayerList is included in the
measurementReportAppLayerList.
1>        if the RRC message segmentation is enabled based on the field rrc-SegAllowed
received in appLayerMeasConfig, and the encoded RRC message is larger than the
maximum supported size of a PDCP SDU:
          2>      initiate the UL message segment transfer procedure;
1>        else:
          2>      submit the MeasurementReportAppLayer message to lower layers for
transmission upon which the procedure ends.
```

That is, it may be specified that MeasurementReportAppLayer-r17-IEs including only measConfigAppLayerId (or/and appLayerSessionStatus) are not included in the MeasurementReportAppLayer message.

FIGS. 11C to 11H illustrate structures of a message for reporting a QoE measurement result according to an embodiment of the disclosure.

In an embodiment, the operations for setting the information included in the message for reporting the QoE measurement result of FIGS. 11C to 11H and for transmitting the message can be referred to in FIGS. 9A to 9B or FIGS. 10A to 10B.

Figure 11C:
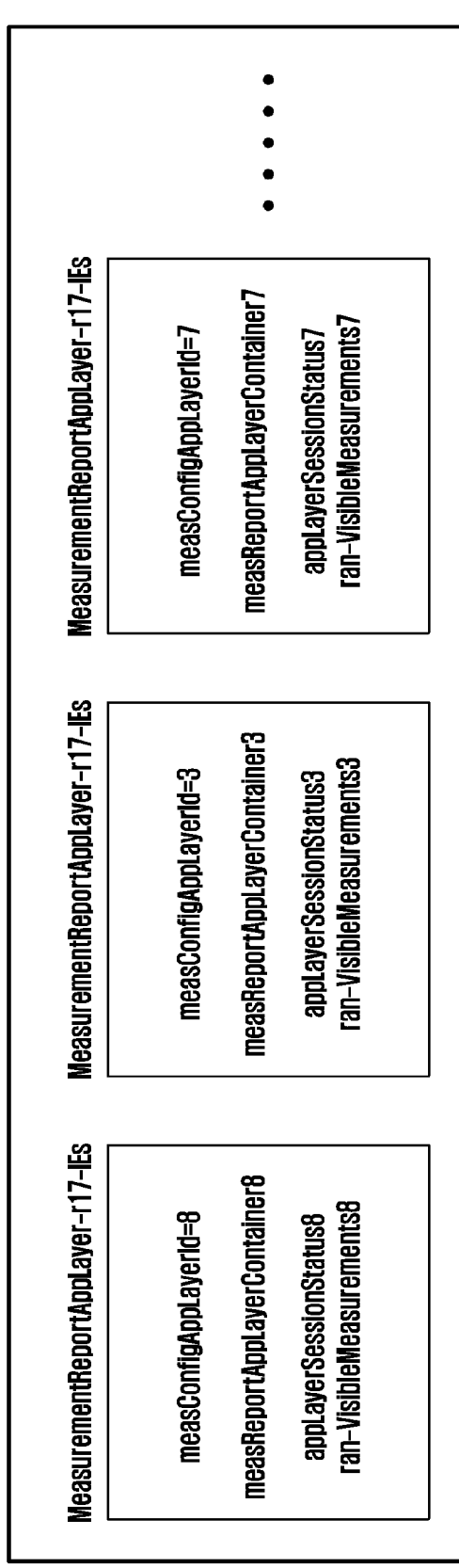
FIG. 11C illustrates the structure of a message for reporting a QoE measurement result according to an embodiment of the disclosure.

As shown in FIG. 11C, the MeasurementReportAppLayer message may include only one MeasurementReportAppLayer-r17-IEs for each measConfigAppLayerId. For example, as shown in FIG. 11C, the MeasurementReportAppLayer message may include one MeasurementReportAppLayer-r17-IEs having measConfigAppLayerId of 8, one MeasurementReportAppLayer-r17-IEs having measConfigAppLayerId of 3, and one MeasurementReportAppLayer-r17-IEs having measConfigAppLayerId of 7. In this example, each MeasurementReportAppLayer-r17-IEs includes all four parameters (measConfigAppLayerId, measReportAppLayerContainer, appLayerSessionStatus, ran-VisibleMeasurements), but measReportAppLayerContainer, appLayerSessionStatus, and/or ran-VisibleMeasurements, which are optional fields, may be omitted.

Figure 11D:
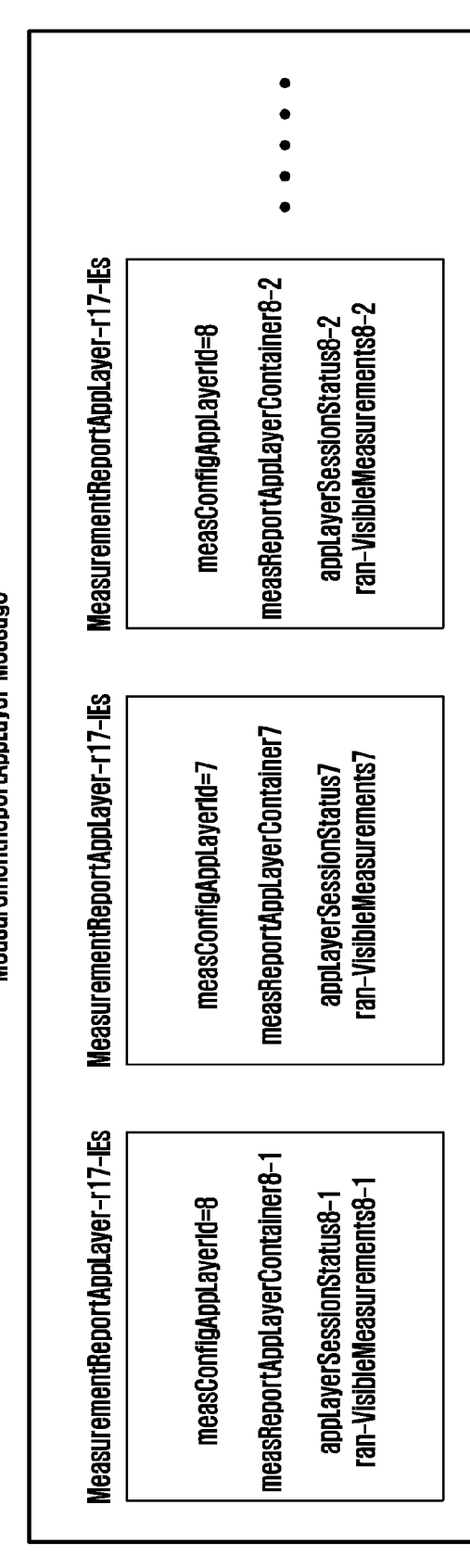
FIG. 11D illustrates the structure of a message for reporting a QoE measurement result according to an embodiment of the disclosure.
Figure 11E:
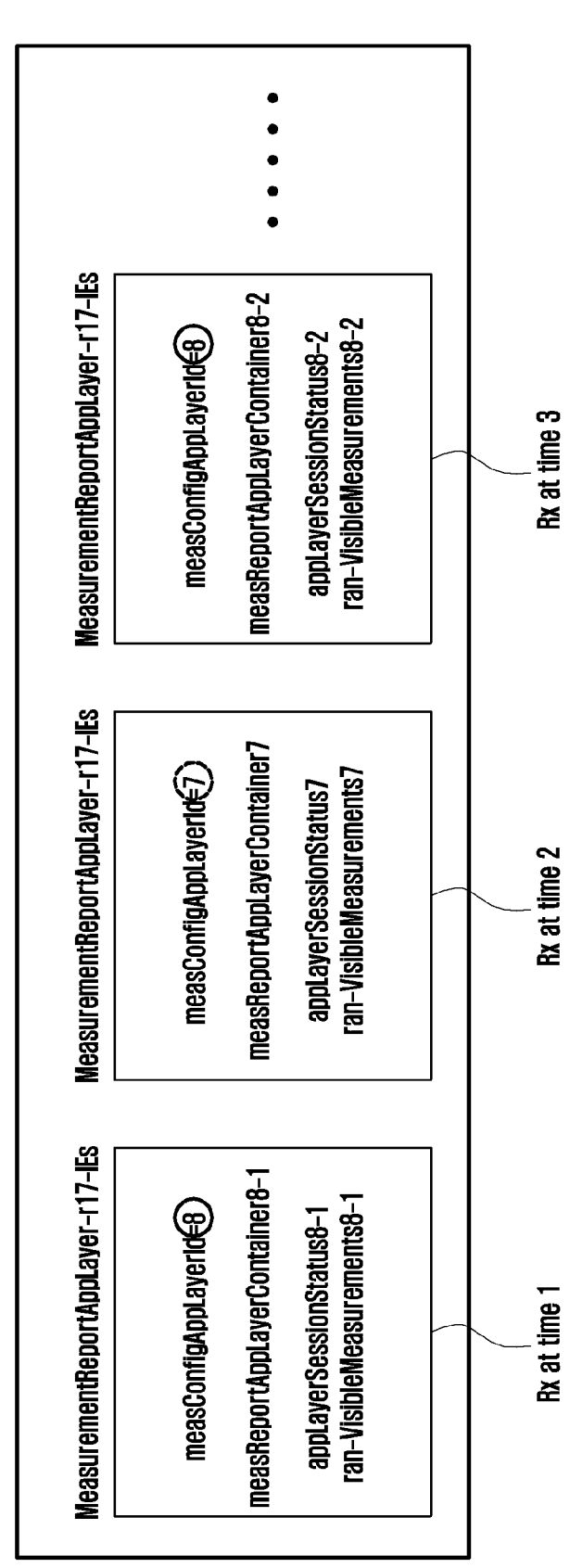
FIG. 11E illustrates the structure of a message for reporting a QoE measurement result according to an embodiment of the disclosure.
Figure 11F:
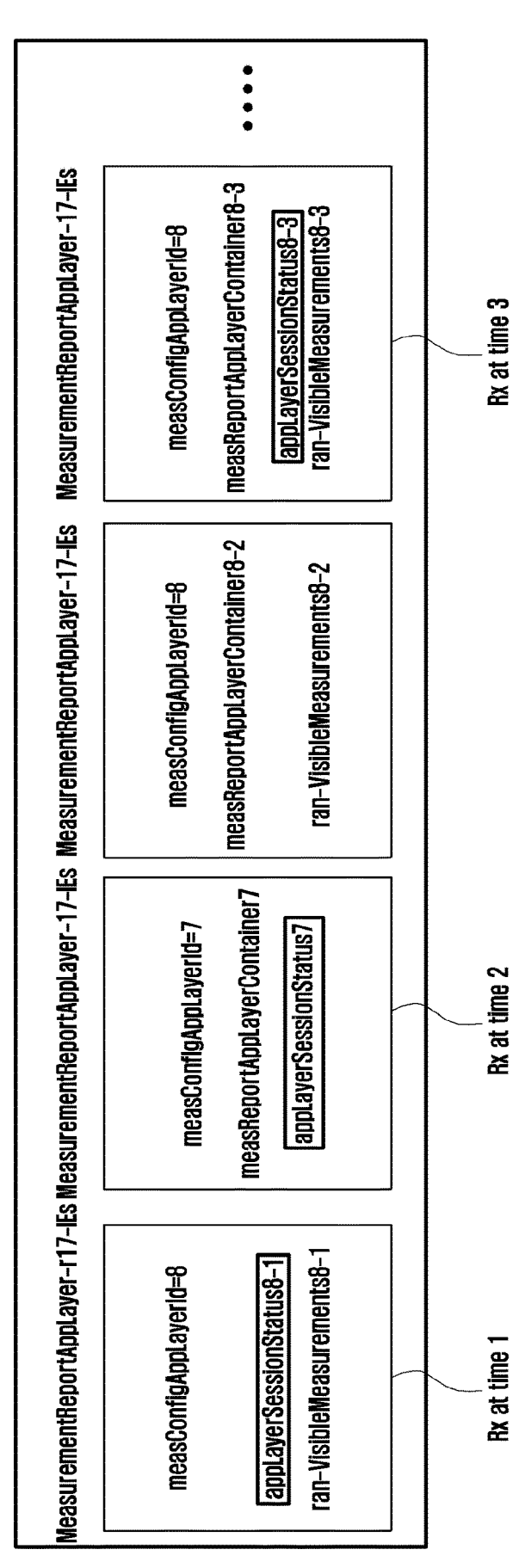
FIG. 11F illustrates a structure of a message for reporting a QoE measurement result according to an embodiment of the disclosure.
Figure 11G:
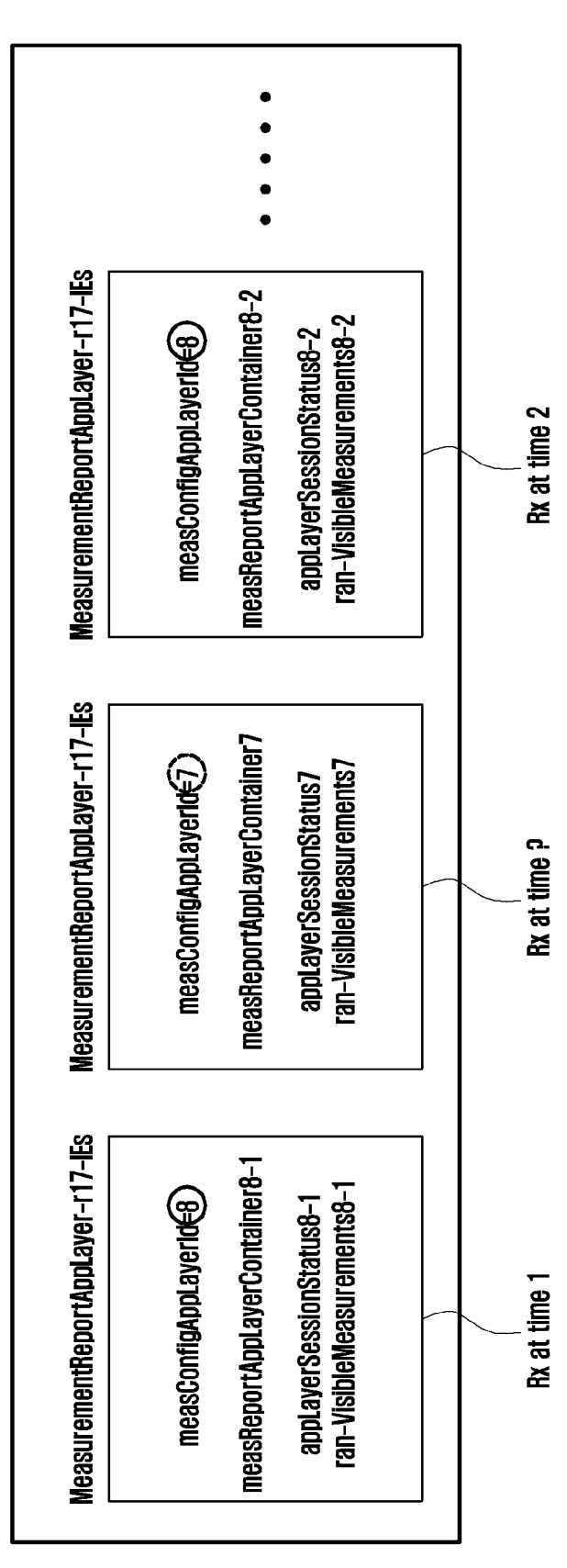
FIG. 11G illustrates the structure of a message for reporting a QoE measurement result according to an embodiment of the disclosure.
Figure 11H:
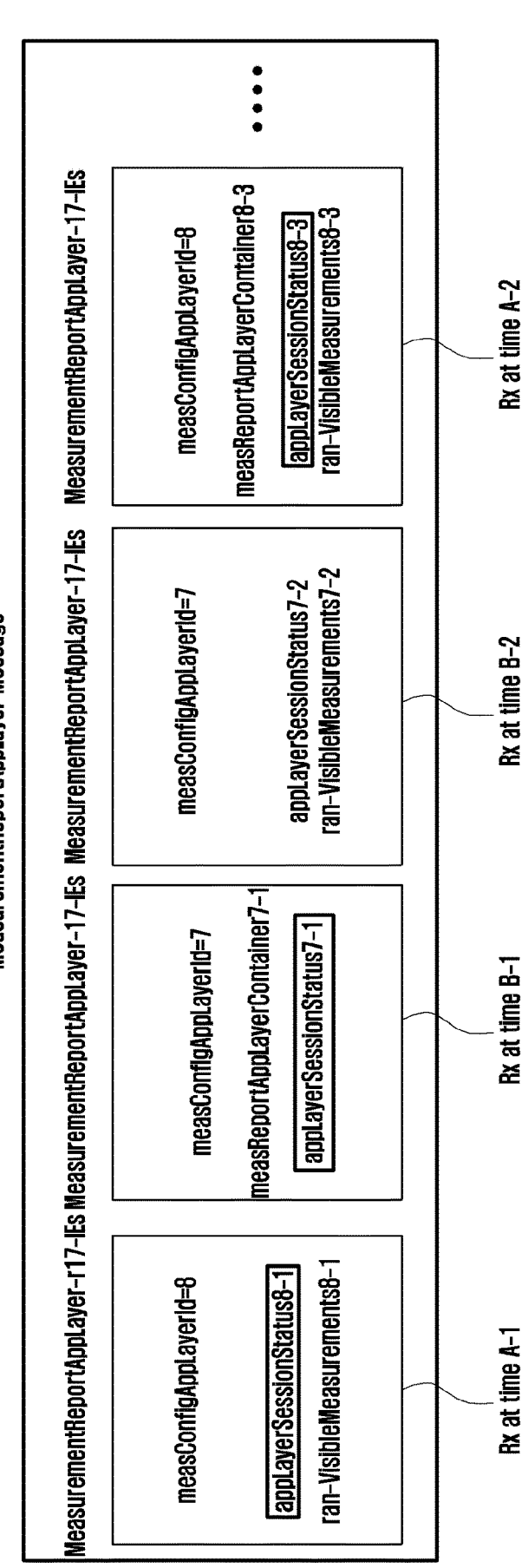
FIG. 11H illustrates the structure of a message for reporting a QoE measurement result according to an embodiment of the disclosure.

As shown in FIG. 11D, the MeasurementReportAppLayer message may include multiple MeasurementReportAppLayer-r17-IEs for the same measConfigAppLayerId (There can be both multiple QoE reports with different measConfigAppLayerId and multiple QoE reports with the same measConfigAppLayerId in the MeasurementReportAppLayer message). For example, as shown in FIG. 11D, the MeasurementReportAppLayer message may include two MeasurementReportAppLayer-r17-IEs having measConfigAppLayerId of 8 and one MeasurementReportAppLayer-r17-IEs having measConfigAppLayerId of 7. In this example, each MeasurementReportAppLayer-r17-IEs includes all four parameters (measConfigAppLayerId, measReportAppLayerContainer, appLayerSessionStatus, ran-VisibleMeasurements), but measReportAppLayerContainer, appLayerSessionStatus, and/or ran-VisibleMeasurements, which are optional fields, may be omitted.

A problem to be solved by the disclosure is that, when multiple MeasurementReportAppLayer-r17-IEs are included in a MeasurementReportAppLayer message, a base station, OAM, TCE server, or MCE server receiving the same may not know a temporal order in which MeasurementReportAppLayer-r17-IEs are generated. That is, there is no indication indicating a generation time for each MeasurementReportAppLayer-r17-IEs, and there is no rule for a UE to store multiple MeasurementReportAppLayer-r17-IEs in the MeasurementReportAppLayer message. In addition, the same problem exists when multiple MeasurementReportAppLayer-r17-IEs having the same measConfigAppLayerId are included in the MeasurementReportAppLayer message. The generation time (or measurement time) or generation order of the QoE report may be very important to the base station or OAM or TCE server or MCE server. In case that the received QoE report corresponds to data having occurred a long time ago, the QoE report may be information that is not useful for the base station or OAM or TCE server or MCE server to optimize the current network situation.

In addition, in FIG. 11D, with regard to two MeasurementReportAppLayer-r17-IEs having the same measConfigAppLayerId 8, for example, the base station or OAM or TCE server or MCE server may not know which one of the two MeasurementReportAppLayer-r17-IEs is first or last generated (or measured) data. For example, when appLayerSessionStatus 8-1 indicates "started" and appLayerSessionStatus 8-2 indicates "stopped." the base station (or OAM or TCE server or MCE server) may not know whether the corresponding application session is started and then stopped or is stopped and then started, and accordingly, incorrect interpretation may cause a network optimization failure. In addition, in case that measReportAppLayerContainer 8-1 (or ran-VisibleMeasurements 8-1) has good overall QoE performance index while measReportAppLayer-Container 8-2 (or ran-VisibleMeasurements 8-2) has poor overall QoE performance index, for example, it is impossible to determine whether the latest network has a problem or a relatively older network has a problem in the case of not knowing the generation order of the MeasurementReportAppLayer-r17-IEs.

In an embodiment provided by the disclosure to solve the above problem, the UE may specify the order of each MeasurementReportAppLayer-r17-IEs in the MeasurementReportAppLayer message through a separate indicator (e.g., createdOrder) as shown in Table 27 below.

Method 5) an order in which the UE AS layer receives information stored in ran-VisibleMeasurements from the app layer. In this case, the order may be indicated only for MeasurementReportAppLayer-r17-Ies including ran-VisibleMeasurements.

Method 6) a combination of some or all of the methods 3, 4, and 5 above. For example, when methods 3 and 4 are combined, an indicator for indicating the order for measReportAppLayerContainer (e.g., createdOrder1) and an indicator for indicating the order for appLayerSessionStatus (e.g., createdOrder2) may be defined separately.

A lower-order value may indicate a more recent QoE report. Alternatively, a higher-order value may indicate a more recent QoE report.

The UE may configure the indicator for each MeasurementReportAppLayer-r17-Ies only when multiple MeasurementReportAppLayer-r17-Ies are included in the Measure-

TABLE 27

```
-- ASN1START
-- TAG-MEASUREMENTREPORTAPPLAYER-START
MeasurementReportAppLayer-r17 ::=              SEQUENCE {
    criticalExtensions                    CHOICE {
        measurementReportAppLayerList-r17                        SEQUENCE (SIZE
(1..maxNrofAppLayerMeas-r17)) OF MeasurementReportAppLayer-r17-IEs,
        criticalExtensionsFuture              SEQUENCE { }
    }
}
MeasurementReportAppLayer-r17-IEs ::=              SEQUENCE {
    measConfigAppLayerId-r17              MeasConfigAppLayerId-r17,
        createdOrder
        INTEGER (1.. maxNrofAppLayerMeas-r17)
OPTIONAL,
    measReportAppLayerContainer-r17                        OCTET STRING
OPTIONAL,
    appLayerSessionStatus-r17                        ENUMERATED {started, stopped}
OPTIONAL,
    ran-VisibleMeasurements-r17                        RAN-VisibleMeasurements-r17
OPTIONAL,
    lateNonCriticalExtension                        OCTET STRING
OPTIONAL,
    nonCriticalExtension                        SEQUENCE{ }
OPTIONAL
}
RAN-VisibleMeasurements-r17 ::=              SEQUENCE {
    appLayerBufferLevelList-r17                        SEQUENCE (SIZE (1..8)) OF
AppLayerBufferLevel-r17                        OPTIONAL,
    initialPlayoutDelay-r17                        INTEGER (0..30000)
OPTIONAL,
    pdu-SessionIdList-r17                        SEQUENCE (SIZE (1..maxNrofPDU-Sessions-
r17)) OF PDU-SessionID                        OPTIONAL,
    ...
}
AppLayerBufferLevel-r17 ::= INTEGER (0..30000)
-- TAG-MEASUREMENTREPORTAPPLAYER-STOP
-- ASN1STOP
```

Here, the order may be one of the following methods.

Method 1) an order in which the UE AS layer generates MeasurementReportAppLayer-r17-IEs Method 2) an order in which the UE AS layer receives the information included in MeasurementReportAppLayer-r17-IEs from the app layer.

Method 3) an order in which the UE AS layer receives information stored in measReportAppLayerContainer from the app layer. In this case, the order may be indicated only for MeasurementReportAppLayer-r17-IEs including measReportAppLayerContainer.

Method 4) an order in which the UE AS layer receives information stored in appLayerSessionStatus from the app layer. In this case, the order may be indicated only for MeasurementReportAppLayer-r17-Ies including appLayerSessionStatus.

mentReportAppLayer message. Alternatively, the UE may configure the indicator for each MeasurementReportAppLayer-r17-Ies having the same measConfigAppLayerId only in case that multiple MeasurementReportAppLayer-r17-Ies having the same measConfigAppLayerId are included in the MeasurementReportAppLayer message.

As a result, the base station or OAM or TCE server or MCE server having received the indicator may identify the generation or measurement order for each MeasurementReportAppLayer-r17-Ies (with respect to the same measConfigAppLayerId).

According to an embodiment provided by the disclosure, the UE may specify time information of each MeasurementReportAppLayer-r17-Ies in the MeasurementReportAppLayer message through a separate indicator (e.g., timestamp) as shown in Table 28 below.

TABLE 28

```
-- ASN1START
-- TAG-MEASUREMENTREPORTAPPLAYER-START
MeasurementReportAppLayer-r17 ::=                    SEQUENCE {
    criticalExtensions                          CHOICE {
        measurementReportAppLayerList-r17                       SEQUENCE (SIZE
(1..maxNrofAppLayerMeas-r17)) OF MeasurementReportAppLayer-r17-IEs,
        criticalExtensionsFuture                SEQUENCE { }
    }
}
MeasurementReportAppLayer-r17-IEs ::=               SEQUENCE {
    measConfigAppLayerId-r17                    MeasConfigAppLayerId-r17,
        createdOrder
        INTEGER (1.. maxTimestamp)
OPTIONAL,
    measReportAppLayerContainer-r17                         OCTET STRING
OPTIONAL,
    appLayerSessionStatus-r17                       ENUMERATED {started, stopped}
OPTIONAL,
    ran-VisibleMeasurements-r17                         RAN-VisibleMeasurements-r17
OPTIONAL,
    lateNonCriticalExtension                               OCTET STRING
OPTIONAL,
    nonCriticalExtension                                   SEQUENCE{ }
OPTIONAL
}
RAN-VisibleMeasurements-r17 ::=                 SEQUENCE {
    appLayerBufferLevelList-r17                        SEQUENCE (SIZE (1..8)) OF
AppLayerBufferLevel-r17                        OPTIONAL,
    initialPlayoutDelay-r17                                INTEGER (0..30000)
OPTIONAL,
    pdu-SessionIdList-r17                      SEQUENCE (SIZE (1..maxNrofPDU-Sessions-
r17)) OF PDU-SessionID                 OPTIONAL,
    ...
}
AppLayerBufferLevel-r17 ::= INTEGER (0..30000)
-- TAG-MEASUREMENTREPORTAPPLAYER-STOP
-- ASN1STOP
```

Here, the time information may be one of the following methods.

Method 1) a time at which the UE AS layer generates MeasurementReportAppLayer-r17-IEs.

Method 2) a time at which the UE AS layer receives the information included in MeasurementReportAppLayer-r17-IEs from the app layer.

Method 3) a time at which the UE AS layer receives the information stored in the measReportAppLayerContainer from the app layer.

Method 4) a time at which the UE AS layer receives information stored in appLayerSessionStatus from the app layer.

Method 5) a time at which the UE AS layer receives information stored in ran-VisibleMeasurements from the app layer.

Method 6) a combination of some or all of the methods 3, 4, and 5 above. For example, when methods 3 and 4 are combined, an indicator for indicating a time for measReportAppLayerContainer (e.g., timestamp1) and an indicator for indicating a time for appLayerSessionStatus (e.g., timerstamp2) may be defined separately.

A time information value may be absolute time information, or may be relative time information based on a specific time (e.g., a time point at which a session starts in the App layer, a time point at which QoE measurement starts in the App layer, or a time point at which the first report is received from the App layer).

The UE may configure the indicator for each MeasurementReportAppLayer-r17-IEs only when multiple MeasurementReportAppLayer-r17-IEs are included in the MeasurementReportAppLayer message. Alternatively, the UE may configure the indicator for each MeasurementReportAppLayer-r17-IEs having the same measConfigAppLayerId only when multiple MeasurementReportAppLayer-r17-IEs having the same measConfigAppLayerId are included in the MeasurementReportAppLayer message.

As a result, the base station or OAM or TCE server or MCE server receiving this indicator may determine the generation or measurement time point for each MeasurementReportAppLayer-r17-IEs (with respect to the same measConfigAppLayerId).

According to an embodiment provided by the disclosure, the UE may specify the order (which may be one of the methods relating to the order) through the storage order of each MeasurementReportAppLayer-r17-IEs in the MeasurementReportAppLayer message without introducing a separate indicator. MeasurementReportAppLayer-r17-IEs having been stored in the N-th entry of measurementReportAppLayerList regardless of measConfigAppLayerId within the MeasurementReportAppLayer message may represent the N-th turn MeasurementReportAppLayer-r17-IEs (e.g., MeasurementReportAppLayer-r17-IEs having been received for the N-th time from the app layer). For example, in FIG. 11E, the first entry (leftmost) in the MeasurementReportAppLayer message may be MeasurementReportAppLayer-r17-IEs having been received first (time 1) from the app layer. The second entry may be MeasurementReportAppLayer-r17-IEs having been received second (time 2) from the app layer. The third entry may be MeasurementReportAppLayer-r17-IEs having been received for the third time (time 3) from the app layer.

If the method 3 (or method 4 or 5) having been described relating to the definition of order is applied to this embodiment, the method may be applied only to an entry including measReportAppLayerContainer (or appLayerSessionStatus, or ran-VisibleMeasurements). For example, when the method 4 is applied, the N-th MeasurementReportAppLayer-r17-IEs entry including appLayerSessionStatus within measurementReportAppLayerList regardless of measConfigAppLayerId within the MeasurementReportAppLayer message may imply the case of receiving, from the app layer, the corresponding appLayerSessionStatus for the N-th time among MeasurementReportAppLayer-r17-IEs including appLayerSessionStatus. For example, in FIG. 11F, the first received appLayerSessionStatus 8-1 may be included as the first entry (among MeasurementReportAppLayer-r17-IEs including appLayerSessionStatus), and the second received appLayerSessionStatus 7 may be included as the second entry (among MeasurementReportAppLayer-r17-IEs including appLayerSessionStatus), the third received appLayerSessionStatus 8-3 may be included as the third entry (among MeasurementReportAppLayer-r17-IEs including appLayerSessionStatus).

As a result, the base station or OAM or TCE server or MCE server having received the corresponding appLayerSessionStatus may identify the order of generation or measurement of measReportAppLayerContainer (or appLayerSessionStatus or ran-VisibleMeasurements).

According to an embodiment provided by the disclosure, a UE may specify an order (this may be one of the methods for defining the order) through the storage order between MeasurementReportAppLayer-r17-IEs having the same measConfigAppLayerId in a MeasurementReportAppLayer message without introducing a separate indicator. MeasurementReportAppLayer-r17-IEs having been stored for the N-th time among MeasurementReportAppLayer-r17-IEs having the same measConfigAppLayerId in the MeasurementReportAppLayer message may indicate the N-th turn MeasurementReportAppLayer-r17-IEs among the MeasurementReportAppLayer-r17-IEs (e.g., MeasurementReportAppLayer-r17-IEs having been received for the N-th time from the app layer). For example, in FIG. 11G, the first entry (leftmost) in the MeasurementReportAppLayer message may correspond to MeasurementReportAppLayer-r17-IEs, having been received first (time 1) from the app layer, among entries having a measConfigAppLayerId value of 8. The second entry may correspond to MeasurementReportAppLayer-r17-IEs, having been first received from the app layer, among entries having a measConfigAppLayerId value of 7.

Alternatively, the second entry may not indicate any time information when there is no other entry having a measConfigAppLayerId value of 7. An entry having a measConfigAppLayerId value of 7 may not indicate a relative order between itself and entries having a measConfigAppLayerId value of 8. That is, an entry may not indicate a relative order between different measConfigAppLayerIds values. The third entry may correspond to MeasurementReportAppLayer-r17-IEs, having been received secondly (time 2) from the app layer, among entries having a measConfigAppLayerId value of 8.

When method 3 (or 4, or 5), having been described relating to the definition of the order in the above embodiment, is applied to this embodiment, the method may be applied only to entries including measReportAppLayerContainer (or appLayerSessionStatus, or ran-VisibleMeasurements). For example, in case that method 4 is applied, the N-th MeasurementReportAppLayer-r17-IEs entry including appLayerSessionStatus for the same measConfigAppLayerId within the MeasurementReportAppLayer message may imply the case of receiving the corresponding appLayerSessionStatus for the N-th time from the app layer among MeasurementReportAppLayer-r17-IEs having the same measConfigAppLayerId including appLayerSessionStatus. For example, in FIG. 11H, the first received appLayerSessionStatus 8-1 having measConfigAppLayerId of 8 may be included as the first entry (among MeasurementReportAppLayer-r17-IEs having measConfigAppLayerId of 8 and including appLayerSessionStatus), and the second received appLayerSessionStatus 8-3 having measConfigAppLayerId of 8 may be included as the second entry (among MeasurementReportAppLayer-r17-IEs having measConfigAppLayerId of 8 and including appLayerSessionStatus). Similarly, the first received appLayerSessionStatus 7-1 having measConfigAppLayerId of 7 may be included as the first entry (among MeasurementReportAppLayer-r17-IEs having measConfigAppLayerId of 7 and including appLayerSessionStatus), and the second received appLayerSessionStatus 7-2 having measConfigAppLayerId of 7 may be included as the second entry (among MeasurementReportAppLayer-r17-IEs having measConfigAppLayerId of 7 and including appLayerSessionStatus).

As a result, the base station or OAM or TCE server or MCE server having received the corresponding appLayerSessionStatus may identify the order of generation or measurement of measReportAppLayerContainer (or appLayerSessionStatus or ran-VisibleMeasurements).

In another embodiment provided by the disclosure, when the UE AS layer receives appLayerSessionStatus information multiple times for the same measConfigAppLayerId from the app layer, the UE AS layer may include only the latest appLayerSessionStatus in a single MeasurementReportAppLayer-r17-IEs within the MeasurementReportAppLayer message and transmit the same, instead of storing the appLayerSessionStatus information multiple times (e.g., generating multiple MeasurementReportAppLayer-r17-IEs within one MeasurementReportAppLayer message or storing the information in multiple MeasurementReportAppLayer-r17-IEs). Since the base station may require only the current status (whether on-going or suspended) of the corresponding session of the app layer, the previously received appLayerSessionStatus may not be included in the MeasurementReportAppLayer message or may be discarded. When appLayerSessionStatus is repeatedly received in the same measConfigAppLayerId, the UE AS layer may discard the previously received appLayerSessionStatus rather than further storing the same, and may store only the new appLayerSessionStatus.

Figure 12:
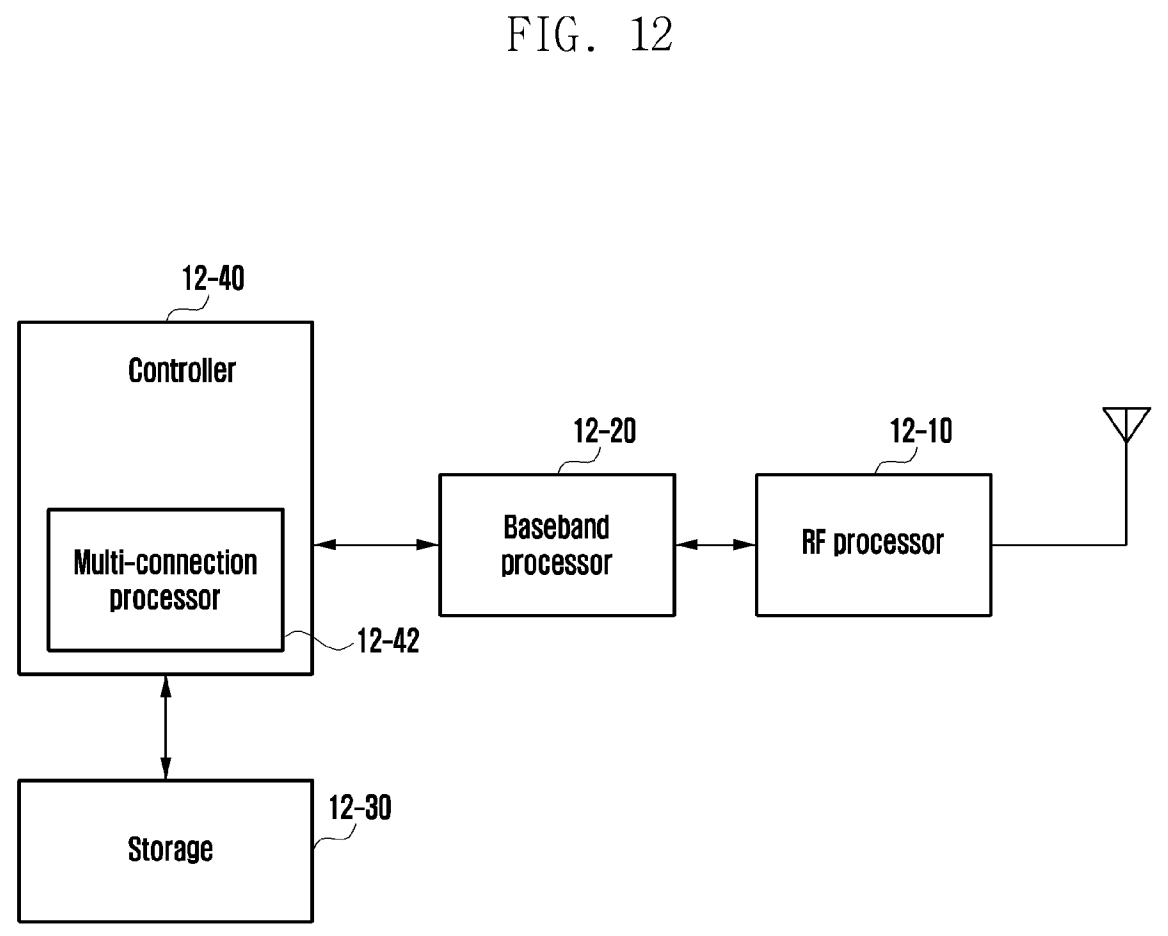

FIG. 12 illustrates an internal structure of a UE according to an embodiment of the disclosure.

Referring to FIG. 12, the UE may include a radio frequency (RF) processor 12-10, a baseband processor 12-20, a storage 12-30, and a controller 12-40.

The RF processor 12-10 performs a function of transmitting and receiving a signal through a radio channel, such as band conversion and amplification of a signal. That is, the RF processor 12-10 up-converts a baseband signal provided from the baseband processor 12-20 to an RF band signal to thus transmit the same through an antenna, and down-converts an RF band signal received through the antenna to a baseband signal. For example, the RF processor 12-10 may include a transmission filter, a reception filter, an amplifier, a mixer, an oscillator, a digital-to-analog converter (DAC), an analog-to-digital converter (ADC), and the like. Although only one antenna is illustrated in FIG. 12, the UE may have multiple antennas. In addition, the RF processor 12-10 may include multiple RF chains. Further, the RF processor 12-10 may perform beamforming. To perform beamforming, the RF processor 12-10 may adjust the phases and magnitudes of signals transmitted and received through multiple antennas or antenna elements. In addition, the RF processor may perform MIMO, and may receive multiple layers when performing the MIMO operation.

The baseband processor 12-20 performs a function of conversion between a baseband signal and a bit string according to the physical layer specification of the system. For example, during data transmission, the baseband processor 12-20 encodes and modulates transmission bit strings, thereby generating complex symbols. In addition, upon receiving data, the baseband processor 12-20 demodulates and decodes a baseband signal provided from the RF processor 12-10 to thus recover reception bit strings. For example, in a case where an orthogonal frequency division multiplexing (OFDM) scheme is applied, when transmitting data, the baseband processor 12-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 12-20 divides the baseband signal provided from the RF processor 12-10 into OFDM symbol units, restores the signals mapped to the subcarriers through a fast Fourier transform (FFT) operation, and then restores reception bit strings through demodulation and decoding.

The baseband processor 12-20 and the RF processor 12-10 may transmit or receive signals as described above. Accordingly, the baseband processor 12-20 and the RF processor 12-10 may be referred to as a "transmitter." a "receiver." a "transceiver." or a "communication unit." Further, at least one of the baseband processor 12-20 and the RF processor 12-10 may include multiple communication modules in order to support multiple different radio access techniques. In addition, at least one of the baseband processor 12-20 and the RF processor 12-10 may include different communication modules to process signals in different frequency bands. For example, the different radio access techniques may include a wireless LAN (e.g., IEEE 802.11), a cellular network (e.g., LTE/NR), and the like. In addition, the different frequency bands may include super-high frequency (SHF) (e.g., 2.NRHz or NRhz) bands or millimeter wave (e.g., 60 GHz) bands.

The storage 12-30 may store data such as fundamental programs, application programs, and configuration information for the UE operation. In particular, the storage 12-30 may store information related to a second access node that performs wireless communication using a second wireless access technology. In addition, the storage 12-30 provides the stored data in response to a request from the controller 12-40.

The controller 12-40 may control the overall UE operation. For example, the controller 12-40 transmits and receives signals through the baseband processor 12-20 and the RF processor 12-10. In addition, the controller 12-40 records and reads data in and from the storage 12-30. To this end, the controller 12-40 may include at least one processor. For example, the controller 12-40 may include a communication processor (CP) for controlling communication and an application processor (AP) for controlling upper layers such as application programs.

Figure 13:
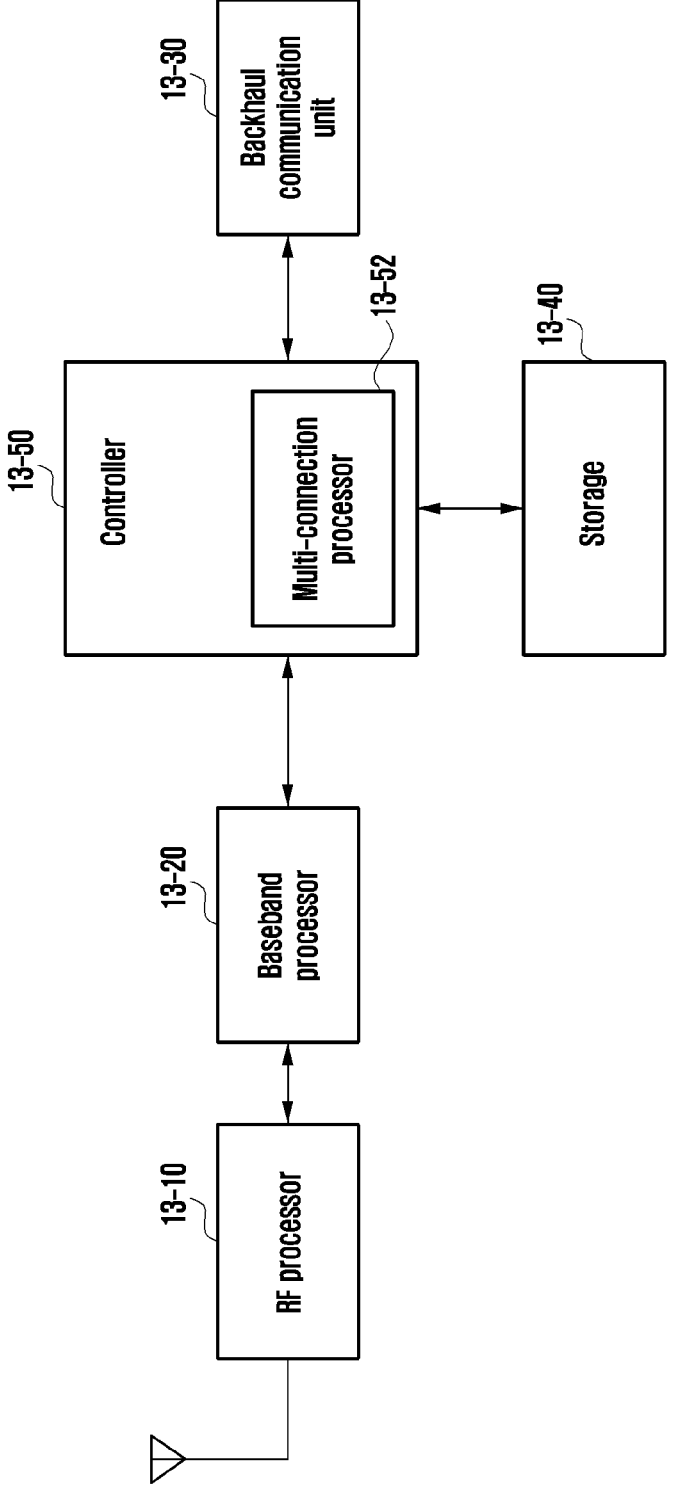
FIG. 13 illustrates a configuration of a base station according to embodiment of the disclosure.

FIG. 13 illustrates a configuration of a base station according to an embodiment of the disclosure.

As shown in FIG. 13, the base station may include a radio frequency (RF) processor 13-10, a baseband processor 13-20, a backhaul communication unit 13-30, a storage 13-40, and a controller 13-50.

The RF processor 13-10 may perform a function of transmitting and receiving a signal through a radio channel, such as band conversion and amplification of a signal. That is, the RF processor 13-10 up-converts a baseband signal provided from the baseband processor 13-20 to an RF band signal to thus transmit the same through an antenna, and down-converts an RF band signal received through the antenna to a baseband signal. For example, the RF processor 13-10 may include a transmission filter, a reception filter, an amplifier, a mixer, an oscillator, a digital-to-analog converter (DAC), an analog-to-digital converter (ADC), and the like. Although only one antenna is illustrated in FIG. 13, the first access node may have multiple antennas. In addition, the RF processor 13-10 may include multiple RF chains. Further, the RF processor 13-10 may perform beamforming. To perform beamforming, the RF processor 13-10 may adjust the phases and magnitudes of signals transmitted and received through multiple antennas or antenna elements. The RF processor may perform downlink MIMO operation by transmitting one or more layers.

The baseband processor 13-20 may perform a function of conversion between a baseband signal and a bit string according to the physical layer standard of the first radio access technology. For example, during data transmission, the baseband processor 13-20 encodes and modulates transmission bit strings, thereby generating complex symbols. In addition, upon receiving data, the baseband processor 13-20 demodulates and decodes a baseband signal provided from the RF processor 13-10 to thus recover reception bit strings. For example, in a case where an OFDM scheme is applied, when transmitting data, the baseband processor 13-20 generates complex symbols by encoding and modulating transmission bit strings, maps the complex symbols to subcarriers, and then configures OFDM symbols through an IFFT operation and CP insertion. In addition, when receiving data, the baseband processor 13-20 divides the baseband signal provided from the RF processor 13-10 into OFDM symbol units, restores the signals mapped to the subcarriers through a fast Fourier transform (FFT) operation, and then restores reception bit strings through demodulation and decoding. The baseband processor 13-20 and the RF processor 13-10 may transmit or receive signals as described above. Accordingly, the baseband processor 13-20 and the RF processor 13-10 may be referred to as a "transmitter." a "receiver." a "transceiver." a "communication unit." or a "wireless communication unit."

The backhaul communication unit 13-30 provides an interface for communicating with other nodes in the network. That is, the backhaul communication unit 13-30 converts a bit string transmitted from a main base station to another node, for example, an auxiliary base station, a core network, etc. into a physical signal, and converts the physical signal received from the other node into a bit string.

The storage 13-40 stores data such as a basic program, an application program, and configuration information for the operation of the main base station. In particular, the storage 13-40 may store information on a bearer assigned to an accessed UE, a measurement result reported from the accessed UE, and the like. In addition, the storage 13-40 may store information serving as a criterion for determining whether to provide or stop multiple connections to the UE. In addition, the storage 13-40 provides the stored data according to the request of the controller 13-50.

The controller 13-50 controls overall operations of the main base station. For example, the controller 13-50 transmits or receives signals through the baseband processor 13-20 and the RF processor 13-10 or through the backhaul communication unit 13-30. In addition, the controller 13-50 records and reads data in and from the storage 13-40. To this end, the controller 13-50 may include at least one processor.

The embodiments of the disclosure described and shown in the specification and the drawings are merely specific examples that have been presented to easily explain the technical contents of the disclosure and help understanding of the disclosure, and are not intended to limit the scope of the disclosure. It will be apparent to those skilled in the art that, in addition to the embodiments set forth herein, other variants based on the technical idea of the disclosure may be implemented. Furthermore, the above respective embodiments may be employed in combination as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, from a base station, a radio resource control (RRC) message including configuration information on an application layer measurement;

for each application layer measurement configuration identifier (measConfigAppLayerId), setting an application layer measurement report entry in an application layer measurement report message, based on the configuration information; and transmitting, to the base station, the application layer measurement report message, wherein the application layer measurement report message includes a plurality of application layer measurement report entries, and wherein each of the plurality of application layer measurement report entries includes a corresponding application layer measurement configuration identifier.

2. The method of claim 1, further comprising:

in case that an encoded RRC message is larger than a maximum supported size of a packet data convergence protocol (PDCP) service data unit (SDU) and an RRC message segmentation is enabled based on RRC segmentation allowance information received in the configuration information, initiating an uplink (UL) message segment transfer procedure, wherein the encoded RRC message includes the application layer measurement report message, and wherein, the RRC segmentation allowance information indicates that the RRC message segmentation of the application layer measurement report message is allowed.

3. The method of claim 1, wherein, in case that a signaling radio bearer 4 (SRB 4) has been configured, the application layer measurement report message is transmitted.

4. The method of claim 1, wherein each of the plurality of application layer measurement report entries further includes at least one of:

measurement report application layer container information, application layer session status information, or radio access network (RAN)-visible measurements information.

5. The method of claim 1, wherein each of the plurality of application layer measurement report entries further includes:

first time stamp information indicating a time at which an access stratum (AS) layer receives, from an application layer, measurement report application layer container information of the application layer measurement report entry, and second time stamp information indicating a time at which the AS layer receives, from the application layer, application layer session status information of the application layer measurement report entry.

6. A method performed by a base station in a wireless communication system, the method comprising:

transmitting, to a terminal, a radio resource control (RRC) message including configuration information on an application layer measurement; and receiving, from the terminal, an application layer measurement report message including, for each application layer measurement configuration identifier (measConfigAppLayerId), an application layer measurement report entry which is set according to the configuration information, wherein the application layer measurement report message includes a plurality of application layer measurement report entries, and wherein each of the plurality of application layer measurement report entries includes a corresponding application layer measurement configuration identifier.

7. The method of claim 6, wherein in case that an encoded RRC message is larger than a maximum supported size of a packet data convergence protocol (PDCP) service data unit (SDU) of the terminal and an RRC message segmentation is enabled based on RRC segmentation allowance information received in the configuration information, the application layer measurement report message is received with segmentation, wherein the encoded RRC message includes the application layer measurement report message, and wherein, the RRC segmentation allowance information indicates that the RRC message segmentation of the application layer measurement report message is allowed.

8. The method of claim 6, wherein, in case that a signaling radio bearer 4 (SRB4) has been configured, the application layer measurement report message is received.

9. The method of claim 6, wherein each of the plurality of application layer measurement report entries further includes at least one of:

measurement report application layer container information, application layer session status information, or radio access network (RAN)-visible measurements information.

10. The method of claim 6, wherein each of the plurality of application layer measurement report entries further includes:

first time stamp information indicating a time at which an access stratum (AS) layer receives, from an application layer, measurement report application layer container information of the application layer measurement report entry, and second time stamp information indicating a time at which the AS layer receives, from the application layer, application layer session status information of the application layer measurement report entry.

11. A terminal in a wireless communication system, the terminal comprising:
a transceiver; and
a controller configured to:
receive, from a base station via the transceiver, a radio resource control (RRC) message including configuration information on an application layer measurement,
for each application layer measurement configuration identifier (measConfigAppLayerId), set an application layer measurement report entry in an application layer measurement report message, based on the configuration information, and
transmit, to the base station via the transceiver, the application layer measurement report message,
wherein the application layer measurement report message includes a plurality of application layer measurement report entries, and
wherein each of the plurality of application layer measurement report entries includes a corresponding application layer measurement configuration identifier.

12. The terminal of claim 11, wherein the controller is further configured to:
in case that an encoded RRC message is larger than a maximum supported size of a packet data convergence protocol (PDCP) service data unit (SDU) and an RRC message segmentation is enabled based on RRC segmentation allowance information received in the configuration information, initiating an uplink (UL) message segment transfer procedure,
wherein the encoded RRC message includes the application layer measurement report message, and
wherein, the RRC segmentation allowance information indicates that the RRC message segmentation of the application layer measurement report message is allowed.

13. The terminal of claim 11, wherein, in case that a signaling radio bearer 4 (SRB4) has been configured, the application layer measurement report message is transmitted.

14. The terminal of claim 11, wherein each of the plurality of application layer measurement report entries further includes at least one of:
measurement report application layer container information,
application layer session status information, or
radio access network (RAN)-visible measurements information.

15. The terminal of claim 11, wherein each of the plurality of application layer measurement report entries further includes:
first time stamp information indicating a time at which an access stratum (AS) layer receives, from an application layer, measurement report application layer container information of the application layer measurement report entry, and
second time stamp information indicating a time at which the AS layer receives, from the application layer, application layer session status information of the application layer measurement report entry.

16. A base station in a wireless communication system, the base station comprising:
a transceiver; and
a controller configured to:
transmit, to a terminal via the transceiver, a radio resource control (RRC) message including configuration information on an application layer measurement, and
receive, from the terminal via the transceiver, an application layer measurement report message including, for each application layer measurement configuration identifier (measConfigAppLayerId), an application layer measurement report entry which is set according to the configuration information,
wherein the application layer measurement report message includes a plurality of application layer measurement report entries, and
wherein each of the plurality of application layer measurement report entries includes a corresponding application layer measurement configuration identifier.

17. The base station of claim 16, wherein in case that an encoded RRC message is larger than a maximum supported size of a packet data convergence protocol (PDCP) service data unit (SDU) of the terminal and an RRC message segmentation is enabled based on RRC segmentation allowance information received in the configuration information, the application layer measurement report message is received with segmentation,
wherein the encoded RRC message includes the application layer measurement report message, and
wherein, the RRC segmentation allowance information indicates that the RRC message segmentation of the application layer measurement report message is allowed.

18. The base station of claim 16, wherein, in case that a signaling radio bearer 4 (SRB4) has been configured, the application layer measurement report message is received.

19. The base station of claim 16, wherein each of the plurality of application layer measurement report entries further includes at least one of:
measurement report application layer container information,
application layer session status information, or
radio access network (RAN)-visible measurements information.

20. The base station of claim 16, wherein each of the plurality of application layer measurement report entries further includes:
first time stamp information indicating a time at which an access stratum (AS) layer receives, from an application layer, measurement report application layer container information of the application layer measurement report entry, and
second time stamp information indicating a time at which the AS layer receives, from the application layer, application layer session status information of the application layer measurement report entry.

* * * * *